US012030315B2

(12) United States Patent
Kanzaki et al.

(10) Patent No.: US 12,030,315 B2
(45) Date of Patent: Jul. 9, 2024

(54) LIQUID DISCHARGE HEAD

(71) Applicant: Brother Kogyo Kabushiki Kaisha, Nagoya (JP)

(72) Inventors: Shotaro Kanzaki, Handa (JP); Taisuke Mizuno, Yokkaichi (JP); Keita Sugiura, Toyokawa (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 435 days.

(21) Appl. No.: 17/331,923

(22) Filed: May 27, 2021

(65) Prior Publication Data

US 2021/0402769 A1 Dec. 30, 2021

(30) Foreign Application Priority Data

Jun. 29, 2020 (JP) ................................ 2020-111487

(51) Int. Cl.
*B41J 2/14* (2006.01)
*B05B 1/14* (2006.01)

(52) U.S. Cl.
CPC ............... *B41J 2/1433* (2013.01); *B05B 1/14* (2013.01); *B41J 2002/14338* (2013.01); *B41J 2002/14467* (2013.01); *B41J 2002/14475* (2013.01)

(58) Field of Classification Search
CPC .................... B05B 17/0607; B05B 1/14; B41J 2002/14338; B41J 2002/14467; B41J 2002/14475; B41J 2/1433
See application file for complete search history.

(56) References Cited

U.S. PATENT DOCUMENTS 7,712,679 B2 5/2010 Onozawa
7,988,068 B2 8/2011 Mita
8,205,978 B2 6/2012 Shimizu
8,672,463 B2 3/2014 Essen et al.
(Continued)

FOREIGN PATENT DOCUMENTS

JP 2010-076175 A 4/2010
JP 2011-520671 A 7/2011
(Continued)

OTHER PUBLICATIONS

May 27, 2021—(US) Co-pending U.S. Appl. No. 17/331,833.
(Continued)

*Primary Examiner* — Christopher R Dandridge
(74) *Attorney, Agent, or Firm* — Banner & Witcoff, Ltd.

(57) ABSTRACT

There is provided a liquid discharge head, including: a first channel member including individual channel rows and first common channels that correspond to the respective individual channel rows; a second channel member including a second common channel provided in common to the first common channels; and a third channel member including at least parts of connection channels connected to the second common channel. One of the connection channels is connected to an end in a longitudinal direction of the second common channel. The liquid discharge head further comprises a communication opening disposed at any other part of the second common channel except the end in the longitudinal direction, the second common channel communicating with the outside through the communication opening.

15 Claims, 18 Drawing Sheets

(56) References Cited

U.S. PATENT DOCUMENTS

| | | | |
|---|---|---|---|
| 10,543,690 | B2 | 1/2020 | Katayama et al. |
| 2006/0066675 | A1 | 3/2006 | Ito et al. |
| 2006/0221125 | A1 | 10/2006 | Konno |
| 2007/0115323 | A1 | 5/2007 | Mori |
| 2008/0246788 | A1 | 10/2008 | Yamashita et al. |
| 2010/0073446 | A1* | 3/2010 | Shimizu ............... B41J 2/17563 347/93 |
| 2011/0115852 | A1 | 5/2011 | Bibl et al. |
| 2011/0148988 | A1 | 6/2011 | Hoisington et al. |
| 2011/0242237 | A1 | 10/2011 | Uezawa |
| 2013/0293641 | A1 | 11/2013 | Essen et al. |
| 2019/0001682 | A1 | 1/2019 | Sonobata |
| 2019/0092003 | A1 | 3/2019 | Mizuno |
| 2019/0092035 | A1 | 3/2019 | Hara et al. |
| 2020/0101732 | A1 | 4/2020 | Kakamu |
| 2020/0147965 | A1 | 5/2020 | Kakamu |
| 2020/0189274 | A1 | 6/2020 | Hayashi |

FOREIGN PATENT DOCUMENTS

| | | | |
|---|---|---|---|
| JP | 2011-213030 | A | 10/2011 |
| JP | 2013-230677 | A | 11/2013 |
| JP | 2014-065313 | A | 4/2014 |
| JP | 2015-036238 | A | 2/2015 |
| JP | 2015-044346 | A | 3/2015 |
| JP | 2016-068376 | A | 5/2016 |
| JP | 2019-059047 | A | 4/2019 |
| JP | 2019-059088 | A | 4/2019 |
| JP | 2020-049868 | A | 4/2020 |
| JP | 2020-078891 | A | 5/2020 |
| JP | 2020-097171 | A | 6/2020 |
| WO | 2018101290 | A1 | 6/2018 |

OTHER PUBLICATIONS

May 27, 2021—(US) Co-pending U.S. Appl. No. 17/331,879.

Mar. 30, 2023—U.S.—Notice of Allowance—U.S. Appl. No. 17/331,879.

Mar. 26, 2024—(JP) Notice of Reasons for Rejection—App 2020-111487.

Apr. 8, 2024—(US)—Non-final Office Action—U.S. Appl. No. 17/331,833.

Mar. 26, 2024—(JP) Notice of Reasons for Rejection—App 2020-111498.

Mar. 26, 2024—(JP) Notice of Reasons for Rejection—App 2020-111496.

* cited by examiner

LIQUID DISCHARGE HEAD

CROSS REFERENCE TO RELATED APPLICATION

The present application claims priority from Japanese Patent Application No. 2020-111487 filed on Jun. 29, 2020, the disclosure of which is incorporated herein by reference in its entirety.

BACKGROUND

Field of the Invention

The present disclosure relates to a liquid discharge head configured to discharge liquid from nozzles.

Description of the Related Art

As an exemplary liquid discharge head that discharges liquid from nozzles, there is publicly known a fluid discharge apparatus that discharges fluid from nozzles. In a publicly-known fluid discharge apparatus, an interposer assembly is disposed on an upper surface of a fluid discharge module, and a housing is disposed above the interposer assembly. An inlet chamber and an outlet chamber formed in the housing are connected, via channels formed in the interposer assembly, to channels including nozzles formed in the fluid discharge module. In such a publicly-known fluid discharge apparatus, a fluid inflowing into the inlet chamber through an opening provided in the inlet chamber flows from the inlet chamber into channels of the fluid discharge module via the channels formed in the interposer assembly. Further, the fluid flowing through the channels of the fluid discharge module flows into the outlet chamber via the channels formed in the interposer assembly and flows out of the outlet chamber through an opening provided in the outlet chamber. Accordingly, the fluid circulates in the fluid discharge apparatus.

SUMMARY

In each of the inlet chamber and the outlet chamber of the above fluid discharge apparatus, air babbles are likely to accumulate at an end far from the opening. Thus, depending on positions of connection openings where the channels of the interposer assembly are connected to the inlet chamber and the outlet chamber, the flowing of fluid circulating as described above may not discharge air bubbles accumulating at the inlet chamber and the outlet chamber.

An object of the present disclosure is to provide a liquid discharge apparatus that allows air bubbles to be discharged reliably.

According to an aspect of the present disclosure, there is provided a liquid discharge head, including: a first channel member including a plurality of individual channel rows and a plurality of first common channels that correspond to the respective individual channel rows, each of the individual channel rows including a plurality of individual channels that include a plurality of nozzles and that are aligned in a first direction, the individual channel rows being arranged in a second direction intersecting with the first direction, the first common channels extending in the first direction, the first common channels being arranged in the second direction, each of the first common channels communicating with the individual channels included in a corresponding one of the individual channel rows, a second channel member disposed at one side of the first channel member in a third direction orthogonal to the first direction and the second direction, and including a second common channel provided in common to the first common channels, a third channel member disposed between the first channel member and the second channel member in the third direction, and including at least parts of a plurality of connection channels connected to the second common channel, the at least parts of the connection channels including a plurality of channels that correspond to the respective first common channels, each of the channels connecting a corresponding one of the first common channels and the second common channel. One of the connection channels is connected to an end in a longitudinal direction of the second common channel. The liquid discharge head further comprises a communication opening disposed at any other part of the second common channel except the end in the longitudinal direction of the second common channel, the second common channel communicating with the outside through the communication opening.

DESCRIPTION OF THE EMBODIMENTS

First Embodiment

A first embodiment of the present disclosure is explained below.

<Schematic Configuration of Printer 1>

Figure 1:
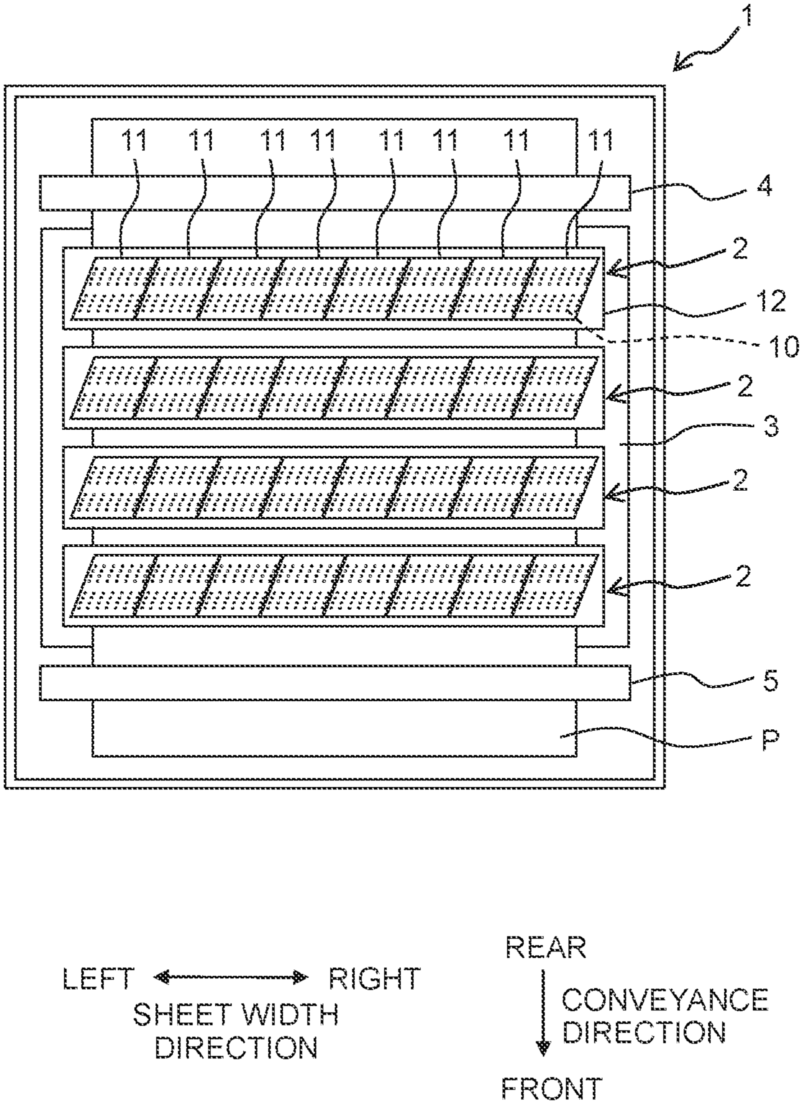
FIG. 1 depicts a schematic configuration of a printer provided with ink jet heads.

As depicted in FIG. 1, a printer 1 according to the first embodiment includes four head units 2, a platen 3, and conveyance rollers 4, 5.

Each head unit 2 includes eight ink-jet heads 11 and a head holding member 12. In each ink-jet head 11, ink is discharged from nozzles 10 formed in a lower surface of the ink-jet head 11. The eight ink-jet heads 11 are arranged in a sheet width direction ("second direction" of the present disclosure) that extends horizontally.

In this configuration, the nozzles 10 of the eight ink-jet heads 11 are arranged over an entire length in the sheet width direction of a recording sheet P. That is, each head unit 2 is a so-called line head. The following explanation is made while defining the right side and the left side in the sheet width direction as indicated in FIG. 1.

The head holding member 12 is a rectangular plate-like member that extends in the sheet width direction and a conveyance direction. The conveyance direction extends horizontally and is orthogonal to the sheet width direction. The head holding member 12 holds the eight ink-jet heads 11. The following explanation is made while defining the front side and the rear side in the conveyance direction as indicated in FIG. 1.

The four head units 2 are arranged in the conveyance direction. A black ink is discharged from the nozzles 10 of a head unit 2 included in the four head units 2 and positioned at the rearmost side. A yellow ink is discharged from the nozzles 10 of a head unit 2 included in the four head units 2 and positioned at the second rearmost side. A cyan ink is discharged from the nozzles 10 of a head unit 2 included in the four head units 2 and positioned at the third rearmost side. A magenta ink is discharged from the nozzles 10 of a head unit 2 included in the four head units 2 and positioned at the frontmost side.

The platen 3 is disposed below the head units 2. The platen 3 extends over the entire length in the sheet width direction of the recording sheet P and extends over the four head units 2 in the conveyance direction. The platen 3 faces the nozzles 10 of the four head units 2 and supports the recording sheet P from below.

The conveyance roller 4 is disposed at the rear side of the four head units 2 and the platen 3. The conveyance roller 5 is disposed at the front side of the four head units 2 and the platen 3. The conveyance rollers 4 and 5 convey the recording sheet P in the conveyance direction.

In the printer 1, inks are discharged from the nozzles 10 of the eight ink-jet heads 11 of the head units 2 while the recording sheet P is conveyed in the conveyance direction by use of the conveyance rollers 4 and 5. Accordingly, recording is performed on the recording sheet P.

<Ink-Jet Head 11>

Figure 2:
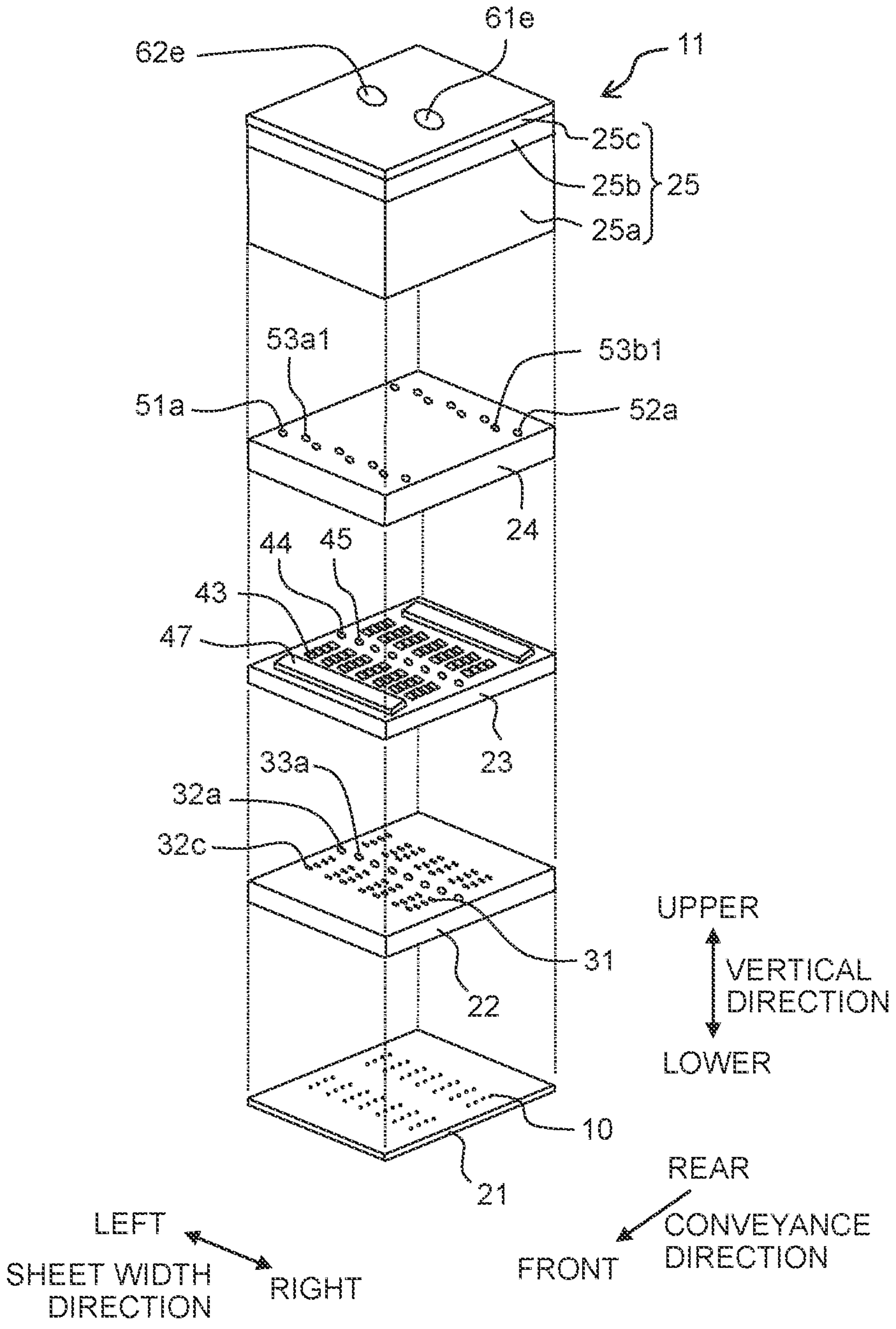
FIG. 2 is an exploded perspective view of a schematic configuration of the ink-jet head.

Subsequently, a structure of the ink-jet head 11 is explained. As depicted in FIG. 2, the ink-jet head 11 includes a nozzle member 21, a first common channel member 22, an actuator member 23, a third common channel member 24 ("third channel member" of the present disclosure), and a second common channel member 25 ("second channel member" of the present disclosure). Those members are stacked in a vertical direction ("third direction" of the present disclosure) in this order from below. A combination of the nozzle member 21 and the first common channel member 22 and the actuator member 23 corresponds to a "first channel member" of the present disclosure. In the first embodiment, the upper side in the vertical direction corresponds to "one side in the third direction", and the lower side in the vertical direction corresponds to "the other side in the third direction".

Figure 3:
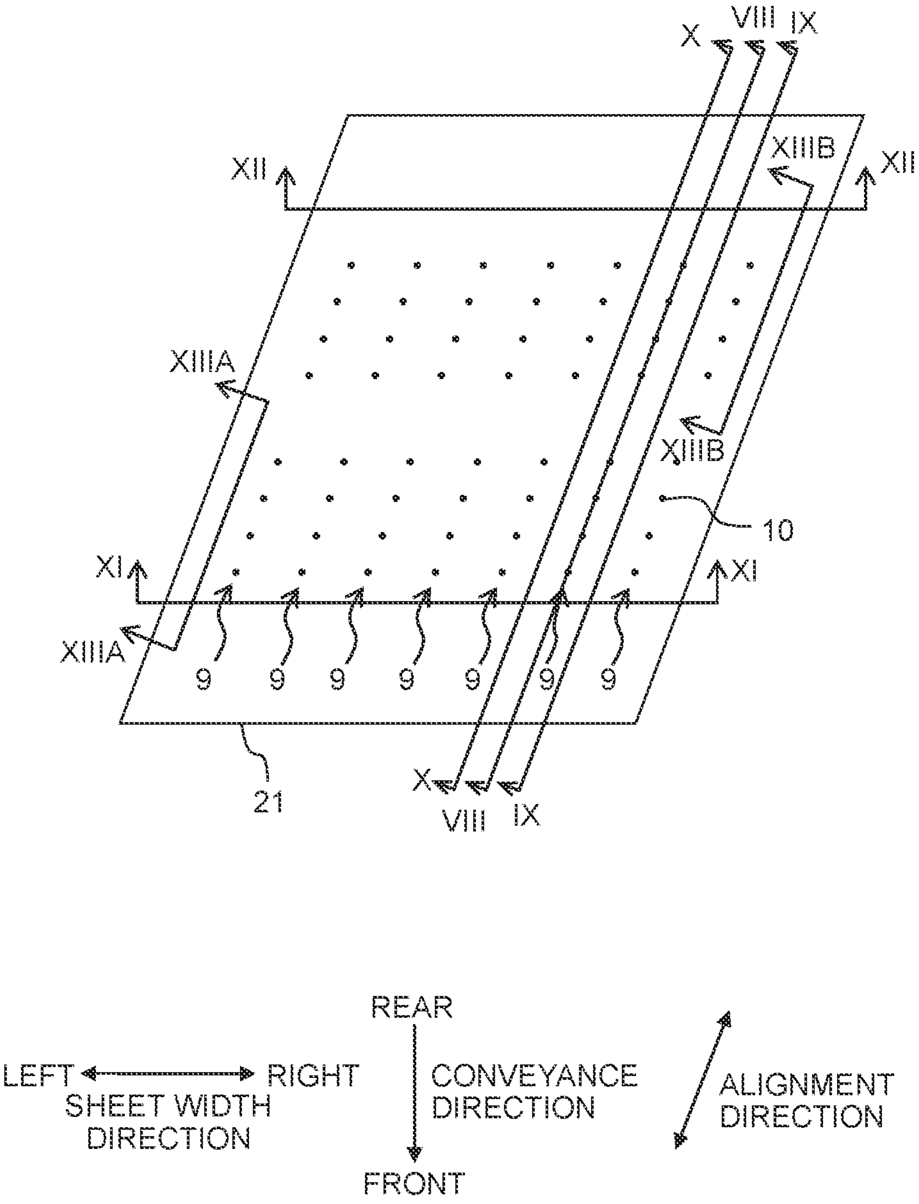
FIG. 3 is a plan view of a nozzle member.
Figure 8:
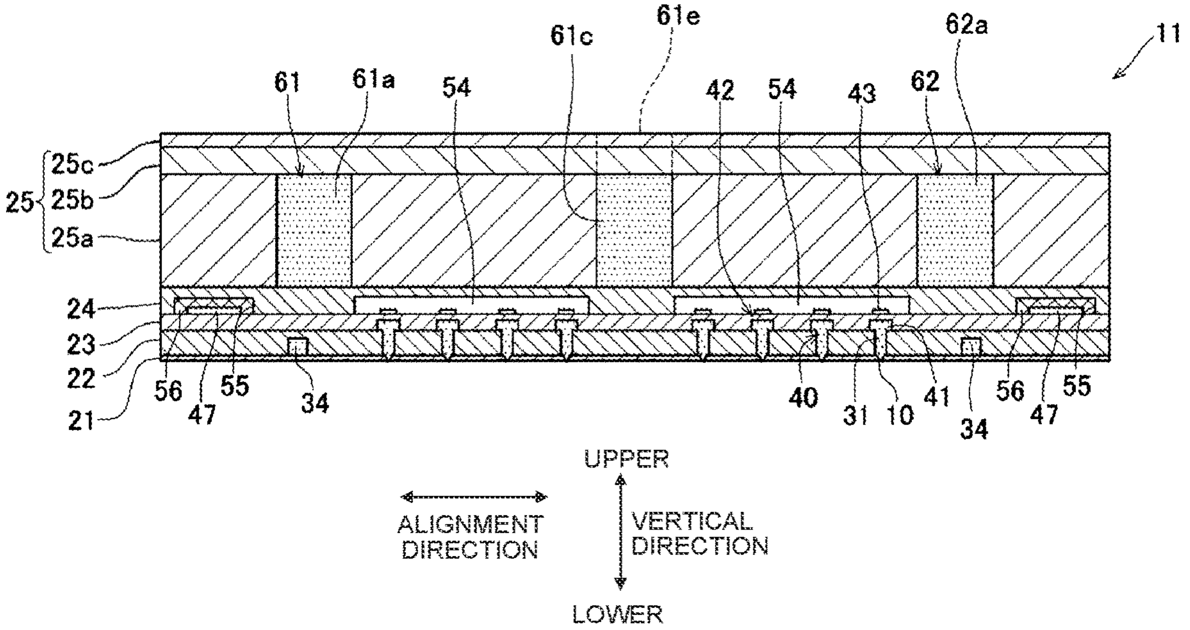
FIG. 8 is a cross-sectional view of the ink-jet head taken along a line VIII-VIII in FIGS. 3 to 7.
Figure 9:
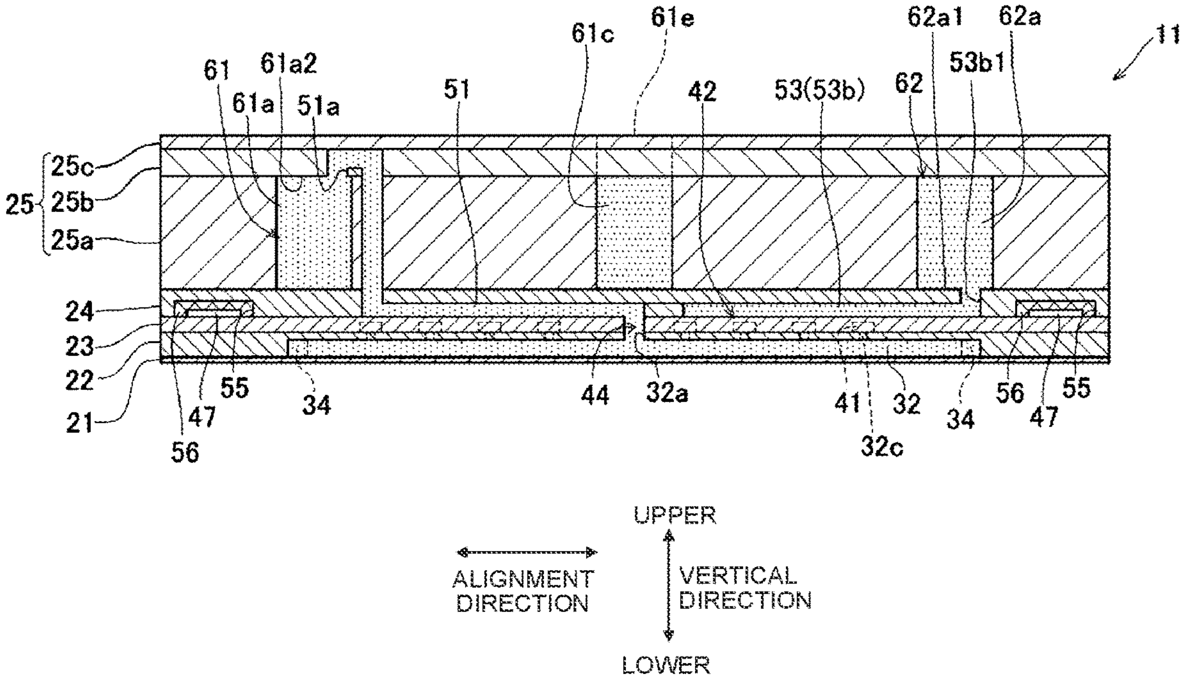
FIG. 9 is a cross-sectional view of the ink-jet head taken along a line IX-IX in FIGS. 3 to 7.
Figure 10:
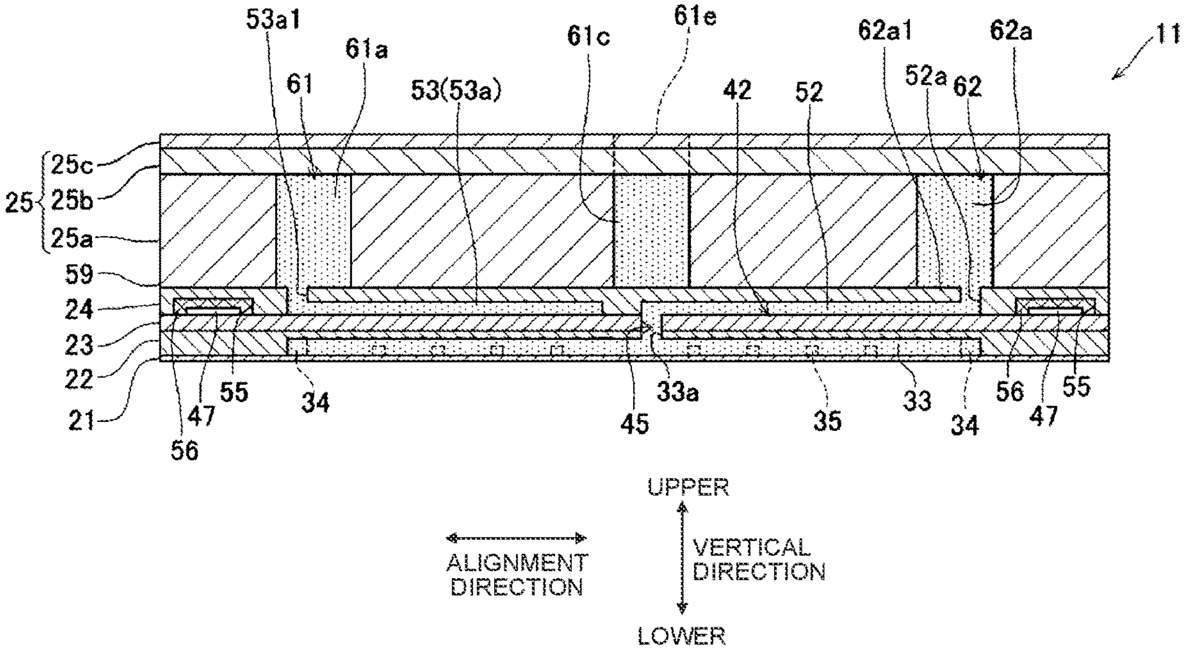
FIG. 10 is a cross-sectional view of the ink-jet head taken along a line X-X in FIGS. 3 to 7.

The nozzle member 21, which is formed from a synthetic resin material or the like, is a plate-like member. The thickness (length in the vertical direction) of the nozzle member 21 is approximately 50 to 100 μm. As depicted in FIGS. 2, 3, and 8, seven nozzle rows 9 arranged in the sheet width direction are formed in the nozzle member 21. Each nozzle row 9 includes the nozzles 10 aligned in an alignment direction ("first direction" of the present disclosure). The alignment direction extends horizontally and is inclined to the conveyance direction. In each nozzle row 9, an interval between a nozzle 10 included in the nozzles 10 forming a front-side nozzle group and positioned at the rearmost side and a nozzle 10 included in the nozzles 10 forming a rear-side nozzle group and positioned at the frontmost side is larger than an interval between any other nozzles 10 belonging to each nozzle row 9. Since the nozzles 10 formed in the nozzle member 21 are aligned as described above, the nozzles 10 are arranged at regular intervals in the sheet width direction as view in the conveyance direction.

The first common channel member 22 is formed from a metal material or the like. The first common channel member 22 is disposed on an upper surface of the nozzle member 21. As depicted in FIGS. 2, 4, and 8 to 10, the first common channel member 22 includes descenders 31, four first supply channels 32, four first return channels 33, two bypass channels 34, and individual return channels 35.

Figure 4:
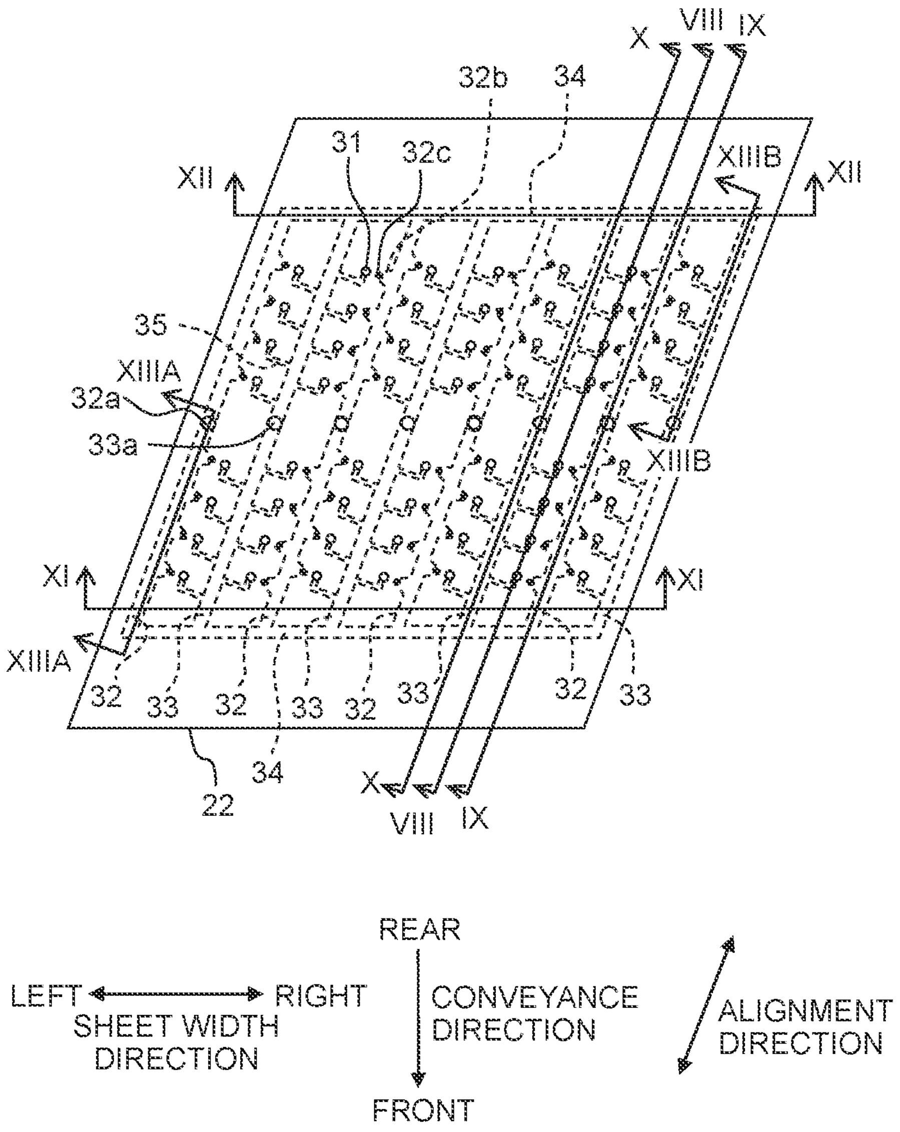
FIG. 4 is a plan view of a first common channel member.

As depicted in FIG. 4, the descenders 31 are formed corresponding to the respective nozzles 10. Each of the descenders 31 overlaps in the vertical direction with the corresponding one of the nozzles 10. The descenders 31 pass through the first common channel member 22 in the vertical direction.

The first supply channels 32, the first return channels 33, and the bypass channels 34 are formed by recesses opened in a lower surface of the first common channel member 22. In the first embodiment, the first common channels 32 and the first return channels 33 correspond to "a plurality of first common channels" of the present disclosure.

The four first supply channels 32 extend in the alignment direction and arranged in the sheet width direction at intervals. A connection opening 32*a*, which is opened in an upper surface of the first common channel member 22, is provided at a center portion in the alignment direction of each first supply channel 32.

The first supply channel 32 positioned at the leftmost side corresponds to the nozzle row 9 positioned at the leftmost side. The first supply channel 32 that is the second from the left corresponds to the second and third nozzle rows 9 from the left. The first supply channel 32 that is the third from the left corresponds to the fourth and fifth nozzle rows 9 from the left. The first supply channel 32 that is the fourth from the left corresponds to the sixth and seventh nozzle rows 9 from the left. Parts of each first supply channel 32 of which positions in the alignment direction are the same as those of the nozzles 10 forming the corresponding nozzle row(s) 9 are protrusions 32*b*. The protrusions 32*b* protrude in a direction that extends horizontally and is orthogonal to the alignment direction. The protrusions 32*b* are provided with connection openings 32*c* that are opened in the upper surface of the first common channel member 22.

The four first return channels 33 extend in the alignment direction. The first return channels 33 and the first supply channels 32 are alternately arranged in the sheet width direction. A connection opening 33*a* that is opened in the upper surface of the first common channel member 22 is provided at a center portion in the alignment direction of each first return channel 33.

The first return channel 33 positioned at the leftmost side corresponds to the first and second nozzle rows 9 from the left. The first return channel 33 that is the second from the left corresponds to the third and fourth nozzle rows 9 from the left. The first return channel 33 that is the third from the left corresponds to the fifth and sixth nozzle rows 9 from the left. The first return channel 33 positioned at the rightmost side corresponds to the nozzle row 9 positioned at the rightmost side.

The two bypass channels 34 extend in the sheet width direction. One of the bypass channels 34 connects front ends of the four first supply channels 32 and front ends of the four first return channels 33. The other of the bypass channels 34 connects rear ends of the four first supply channels 32 and rear ends of the four first return channels 33.

The individual return channels 35 are provided corresponding to the respective descenders 31. Each of the individual return channels 35 is connected to a lower end of the corresponding one of the descenders 31. Each individual return channel 35 extends toward the left-front side in the alignment direction from the connection portion with the descender 31, is bent in the direction that extends horizontally and is orthogonal to the alignment direction, and then is connected to the first return channel 33.

The actuator member 23 is formed from silicon or the like. The actuator member 23 is disposed on the upper surface of the first common channel member 22. As depicted in FIGS. 2, 5, 8 to 10, the actuator member 23 includes pressure chambers 41, a vibration plate 42, driving elements 43, four supply communication channels 44, and four return communication channels 45.

The pressure chambers 41 correspond to the respective nozzles 10. The pressure chambers 41 are formed by recesses that are opened in a lower surface of the actuator member 23. Each pressure chamber 41 has a rectangular shape of which longitudinal direction is the direction that extends horizontally and is orthogonal to the alignment direction. A center portion in the longitudinal direction and the alignment direction of each of the pressure chambers 41 overlaps in the vertical direction with the corresponding one of the nozzles 10 and descenders 31. This allows each of the nozzles 10 to communicate with the corresponding one of the pressure chambers 41 via the descender 31.

An end at one side in the longitudinal direction of each pressure chamber 41 overlaps in the vertical direction with the connection opening 32*c*. This allows the pressure chambers 41 to communicate with the corresponding first supply channel 32 via the connection openings 32*c*. In the pressure chambers 41 corresponding to odd-numbered nozzle rows 9 from the left in the sheet width direction, the one side in the longitudinal direction of each pressure chamber 41 corresponds to the left-rear side. In the pressure chambers 41 corresponding to even-numbered nozzle rows 9 from the left in the sheet width direction, the one side in the longitudinal direction of each pressure chamber 41 corresponds to the right-front side.

In the ink-jet heads 11, each individual channel 40 is formed by the nozzle 10, the descender 31 corresponding to the nozzle 10, the individual return channel 35, and the pressure chamber 41. Further, corresponding to the seven nozzle rows 9 arranged in the sheet width direction, seven individual channel rows 39 are arranged in the sheet width direction. Each individual channel row 39 includes the individual channels 40 aligned in the alignment direction.

As depicted in FIG. 8, the vibration plate 42 is formed by an upper end of the actuator member 23. The vibration plate 42 continuously extends over the pressure chambers 41 to cover the pressure chambers 41. The driving elements 43 correspond to the respective pressure chambers 41. The driving elements 43 are arranged at portions included in an upper surface of the vibration plate 42 and overlapping in the vertical direction with center portions of the respective pressure chambers 41. Each driving element 43 is, for example, a piezoelectric element having a piezoelectric body and an electrode. The driving element 43 deforms a part of the vibration plate 42 that overlaps in the vertical direction with the pressure chamber 41. This applies pressure to ink in the pressure chamber 41 (this applies discharge energy to ink in the individual channel 40), thereby discharging ink from the nozzle 10 that communicates with the pressure chamber 41.

Figure 5:
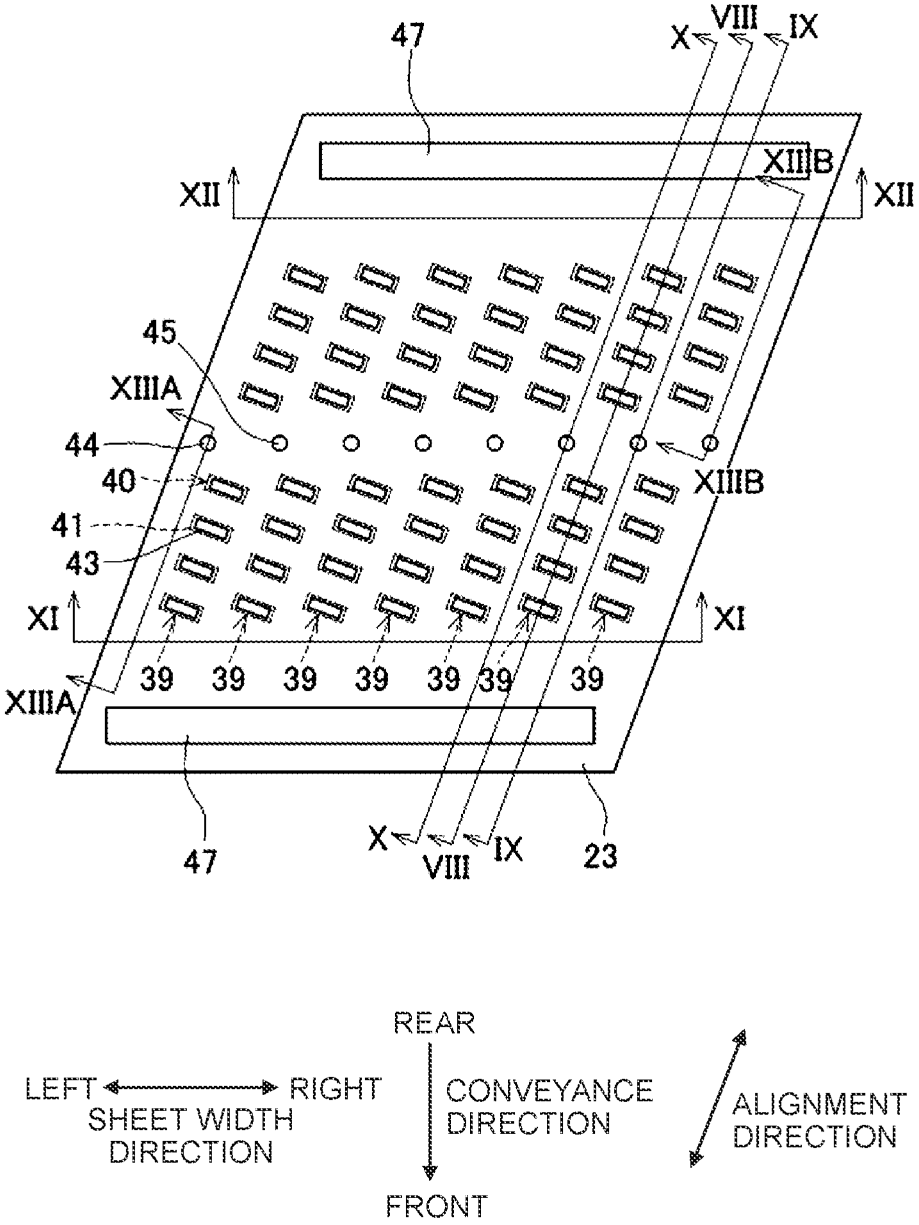
FIG. 5 is a plan view of an actuator member.
Figure 6:
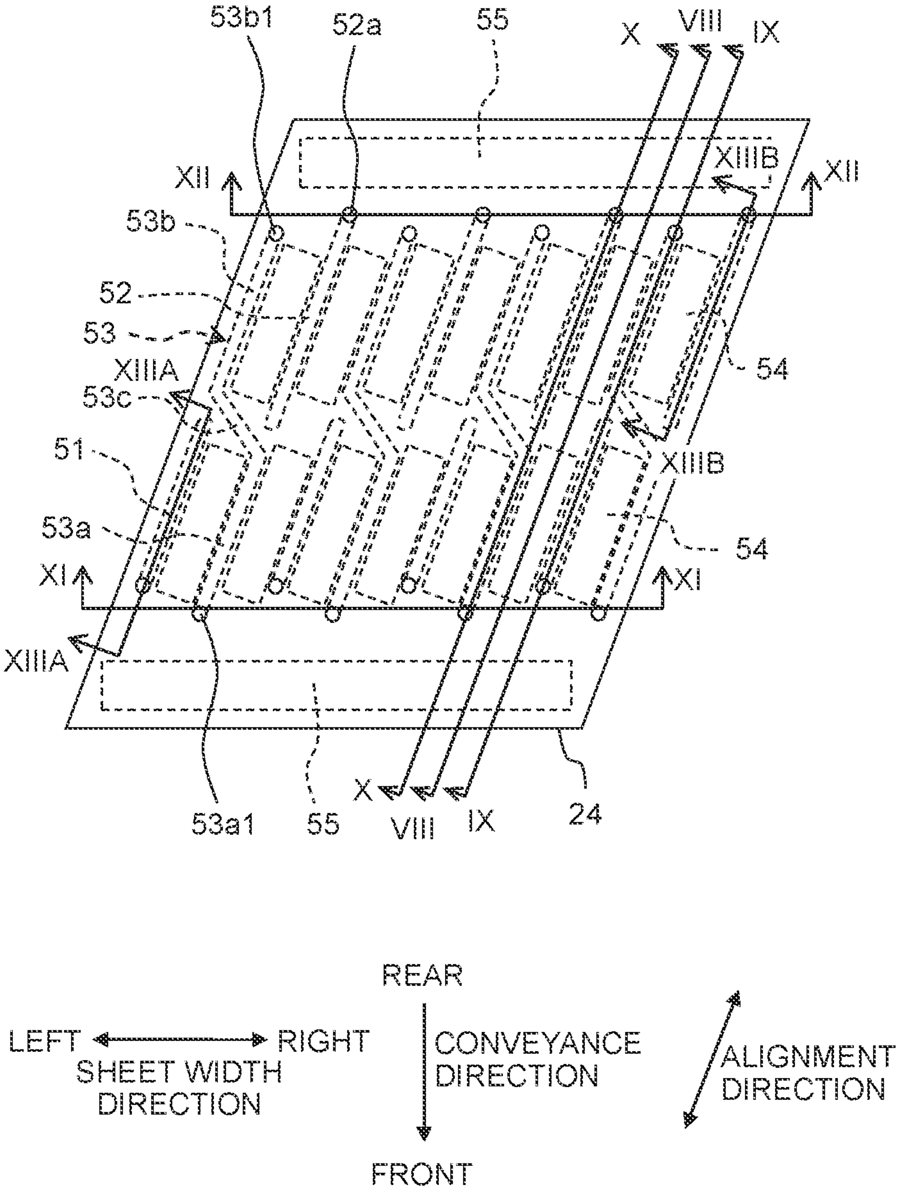
FIG. 6 is a plan view of a third common channel member.

As depicted in FIG. 5, the four supply communication channels 44 correspond to the four first supply channels 32. Each of the supply communication channels 44 overlaps in the vertical direction with the connection opening 32*a* of the corresponding one of the first supply channels 32. The supply communication channels 44 pass through the actuator member 23 to extend in the vertical direction. Lower ends of the supply communication channels 44 are connected to the respective connection openings 32*a*.

The four return communication channels 45 correspond to the four first return channels 33. Each of the return communication channels 45 overlaps in the vertical direction with the connection opening 33*a* of the corresponding one of the first return channels 33. The return communication channels 45 pass through the actuator member 23 to extend in the vertical direction. Lower ends of the return communication channels 45 are connected to the respective connection openings 33*a*.

Driver ICs 47 are placed at both ends in the conveyance direction of an upper surface of the actuator member 23. The driver ICs 47 are arranged such that its longitudinal direction corresponds to the sheet width direction. The driver IC 47 disposed at the front side is connected to driving elements 43 included in the driving elements 43 and forming a front-side driving element group via traces or the like (not depicted). The driver IC 47 disposed at the front side drives the driving elements 43 forming the front-side driving element group. The driver IC 47 disposed at the rear side is connected to driving elements 43 included in the driving elements 43 and forming a rear-side driving element group via traces or the like (not depicted). The driver IC 47 disposed at the rear side drives the driving elements 43 forming the rear-side driving element group.

The third common channel member 24 is formed from silicon or the like. The third common channel member 24 is disposed on the upper surface of the actuator member 23. As depicted in FIGS. 2, 6, and 8 to 10, the third common channel member 24 includes parts of four third supply channels 51, four third return channels 52, four bypass channels 53, fourteen element accommodating portions 54, and two IC accommodating portions 55. The parts of the third supply channels 51, the third return channels 52, the bypass channels 53, the element accommodating portions 54, and the IC accommodating portions 55 are formed by recesses that are opened in a lower surface of the third common channel member 24. In the first embodiment, the third supply channels 51, the third return channels 52, and the bypass channels 53 correspond to "a plurality of connection channels" of the present disclosure.

Each of the third supply channels 51 corresponds to one of the first supply channels 32. The part of the third supply channel 51 extends in the alignment direction over approximately a front half portion of the corresponding first supply channel 32. An end at the right-rear side of the third supply channel 51 is connected to the corresponding supply communication channel 44. In the part of the third supply channel 51, an end at the left-front side extends to an upper surface of the third common channel member 24. Remaining parts of the third supply channel 51 are formed in the second common channel member 25, and explanation therefor is made below.

Each of the third return channels 52 corresponds to one of the first return channels 33. The third return channel 52 extends in the alignment direction over approximately a rear half portion of the corresponding first return channel 33. An end at the left-front side of the third return channel 52 is connected to the corresponding return communication channel 45. An end at the right-rear side of the third return channel 52 extending in the alignment direction is formed having a connection opening 52*a* that is opened in the upper surface of the third common channel member 24.

Each of the four bypass channels 53 includes channel portions 53*a* to 53*c*.

The four channel portions 53*a* forming the four bypass channels 53 extend in the alignment direction. The channel portions 53*a* and the third supply channels 51 are arranged alternately in the sheet width direction. Each channel portion 53*a* is positioned on an extension line of the third return channel 52 in the alignment direction. An end at the left-front side of the channel portion 53*a* extending in the alignment direction is formed having a connection opening 53*a*1 that is opened in the upper surface of the third common channel member 24.

The four channel portions 53*b* forming the four bypass channels 53 extend in the alignment direction. The channel portions 53*b* and the third return channels 52 are arranged alternately in the sheet width direction. Each channel portion 53*b* is positioned on an extension line of the part of the third supply channel 51 in the alignment direction. An end at the right-rear side of the channel portion 53*b* extending in the alignment direction is formed having a connection opening 53*b*1 that is opened in the upper surface of the third common channel member 24.

The four channel portions 53*c* forming the four bypass channels 53 connect the ends at the right-rear side of the channel portions 53*a* and the ends at the left-front side of the channel portions 53*b*.

The fourteen element accommodating portions 54 correspond to the seven nozzle rows 9. Two element accommodating portions 54 included in the fourteen element accommodating portions 54 correspond to one nozzle row 9 included in the seven nozzle rows 9. The two element accommodating portions 54 corresponding to one nozzle row 9 overlap in the vertical direction with driving elements 43 that are included in the driving elements 43 corresponding to one nozzle row 9 and that form the front-side driving element group and driving elements 43 that are included in the driving elements 43 corresponding to one nozzle row 9 and that form the rear-side driving element group. Thus, half of the driving elements 43 corresponding to one nozzle row 9 are accommodated in the corresponding one of the elements accommodating portions 54.

The two IC accommodating portions 55 overlap in the vertical direction with the two driver ICs 47. Each of the driver ICs 47 is accommodated in the corresponding one of the IC accommodating portions 55. In the above arrangement of the two IC accommodating portions 55, the third supply channels 51, the third return channels 52, the bypass channels 53, and the element accommodating portions 54 are arranged in the third common channel member 24 such that they are interposed between the respective IC accommodating portions 55 in the alignment direction. Each of the IC accommodating portions 55 includes a thermal conductive member 56. The thermal conductive member 56 is interposed between the driver IC 47 and the third common channel member 24. The thermal conductive member 56 is formed from, for example, epoxy-based adhesive.

Figure 7:
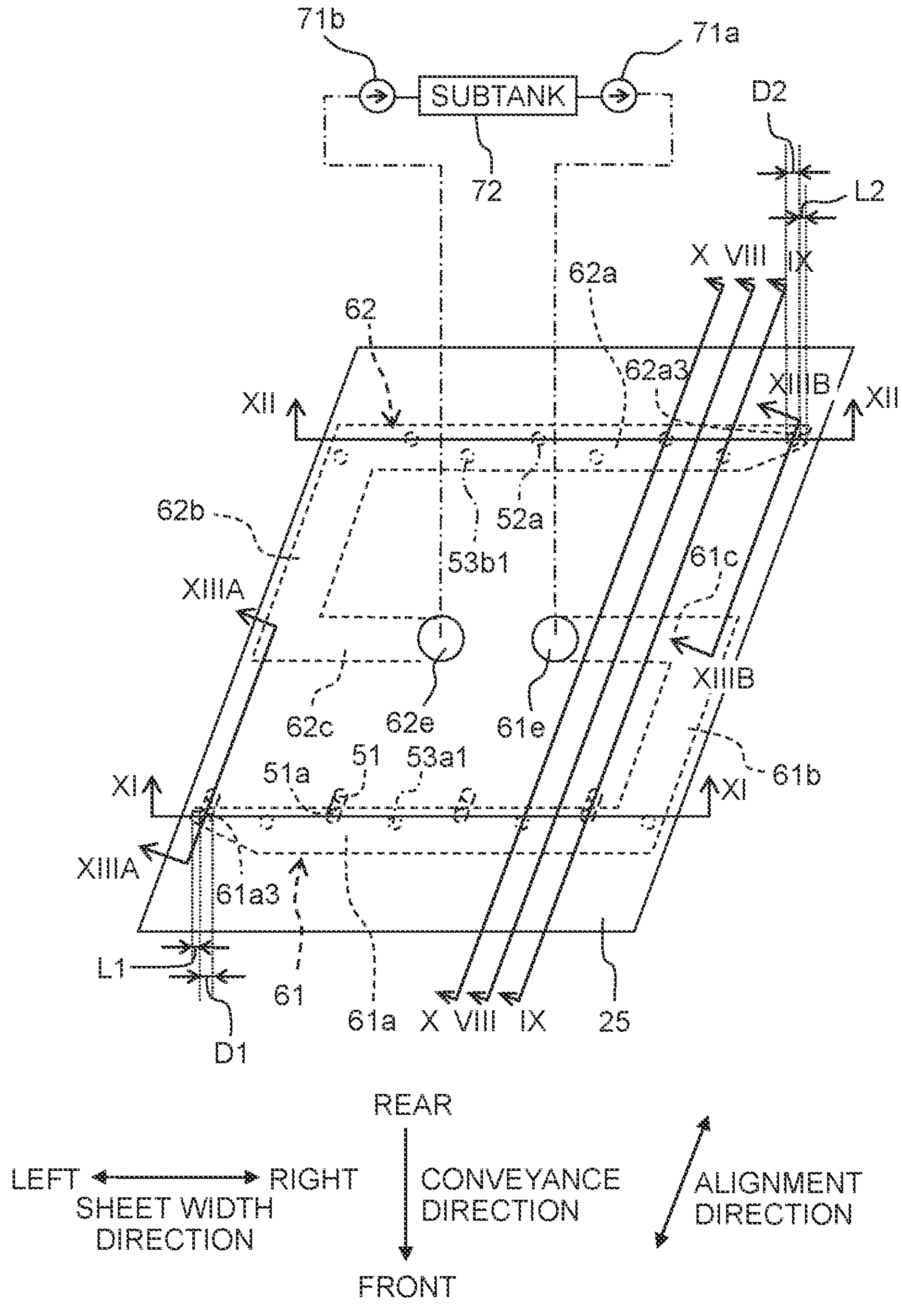
FIG. 7 is a plan view of a second common channel member.

The second common channel member 25 is formed by stacking three plates 25*a* to 25*c* that are formed, for example, from alumina. As depicted in FIGS. 2 and 7 to 13, the second common channel member 25 includes a second supply channel 61, a second return channel 62, and any other parts of the third supply channels 51 except the parts described above. In the first embodiment, the second supply channel 61 and the second return channel 62 correspond to a "second common channel" of the present disclosure. In FIG. 7, positions of the connection openings 52*a*, 53*a*1, 53*b*1 formed in the third common channel member 24 are depicted by long dashed double-short dashed lines for easy understanding of a positional relationship between the second supply channel 61 and the connection openings 52*a* and a positional relationship between the second return channel 62 and the connection openings 53*a*1, 53*b*1.

The second supply channel 61 has channel portions 61*a* to 61*c*. In a front portion of the second common channel member 25, the channel portion 61*a* extends in the sheet width direction. A bottom surface 61*a*1 of the channel portion 61*a* is connected to the connection openings 53*a*1.

Figure 11:
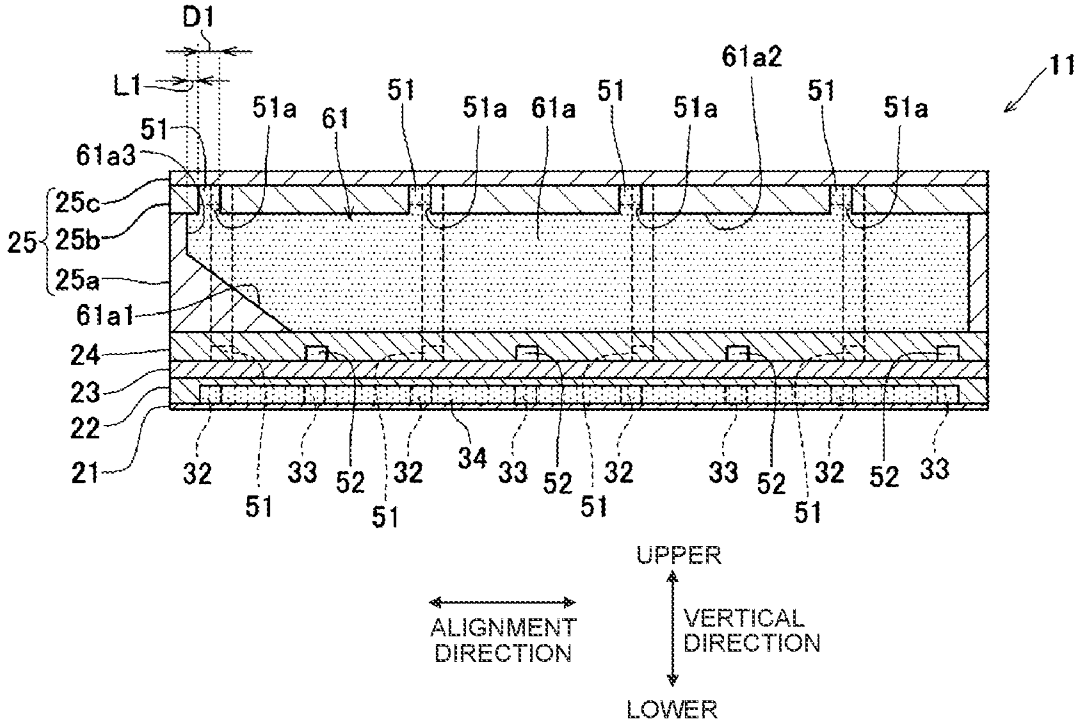
FIG. 11 is a cross-sectional view of the ink-jet head taken along a line XI-XI in FIGS. 3 to 7.

As depicted in FIG. 7, in the channel portion 61*a*, a length in the conveyance direction of its left end (an "end in a longitudinal direction of the second common channel" of the present disclosure) and the vicinity thereof are shorter toward the left side (toward a left end in FIG. 7). Further, as depicted in FIG. 11, in the bottom surface 61*a*1 of the channel portion 61*a*, its left end and the vicinity thereof are inclined to the sheet width direction so that they are positioned at the upper side of its right end and the vicinity thereof.

Each third supply channel 51 extends upward in the vertical direction from an end at the front side of the part extending in the alignment direction in the third common channel member 24 beyond the channel portion 61*a* of the second common channel member 25. Each third supply channel 51 is bent at an upper end of the part extending in the vertical direction to extend toward the left-front side in the alignment direction, is further bend downward, and is connected to a ceiling surface 61*a*2 of the channel portion 61*a*.

Of the four third supply channels 51, the third supply channel 51 positioned at the leftmost side ("one of the connection channels" "one of the third supply channels" of the present disclosure") is connected to a left end of the ceiling surface 61*a*2. More specifically, the connection opening 51*a* of the third supply channel 51 connected to the channel portion 61*a* is a circle having a diameter D1. A distance L1 between an end surface 61*a*3 at the left side of the channel portion 61*a* (an "end surface in the longitudinal direction of the second common channel" of the present disclosure) and the connection opening 51*a* of the third supply channel 51 positioned at the leftmost side is shorter than the diameter D1 of the connection opening 51*a* (length in the sheet width direction). The distance L1 may be zero. That is, a left end of the end surface 61*a*3 and a left end of the connection opening 51*a* may have the same position in the sheet width direction. For example, the diameter D1 is approximately 100 to 500 μm, and the distance L1 is approximately 50 to 200 μm.

The channel portion 61*b* is connected to a right end of the channel portion 61*a*. The channel portion 61*b* extends in the alignment direction from the connection portion with the channel portion 61*a* to a center portion in the conveyance direction of the second common channel member 25. The channel portion 61*c* is connected to a rear end of the channel portion 61*b*. The channel portion 61*c* extends leftward from the connection portion with the channel portion 61*b*. A left end of the channel portion 61*c* is formed having a supply opening 61*e* ("communication opening" of the present disclosure) that is opened in an upper surface of the second common channel member 25.

The supply opening 61*e* is connected to a subtank 72 via a pump 71*a*. The pump 71*a* feeds ink from the subtank 72 toward the supply opening 61*e*. The subtank 72 is connected to a main tank (not depicted) such as an ink cartridge via a tube (not depicted) and ink is supplied from the main tank.

The second return channel 62 has channel portions 62*a* to 62*c*. In a rear portion of the second common channel member 25, the channel portion 62*a* extends in the sheet width direction over the four connection openings 52*a* and the four connection openings 53*b*1. The connection openings 52*a* and 53*b*1 are connected to a bottom surface 62*a*1 of the channel portion 62*a*.

Figure 12:
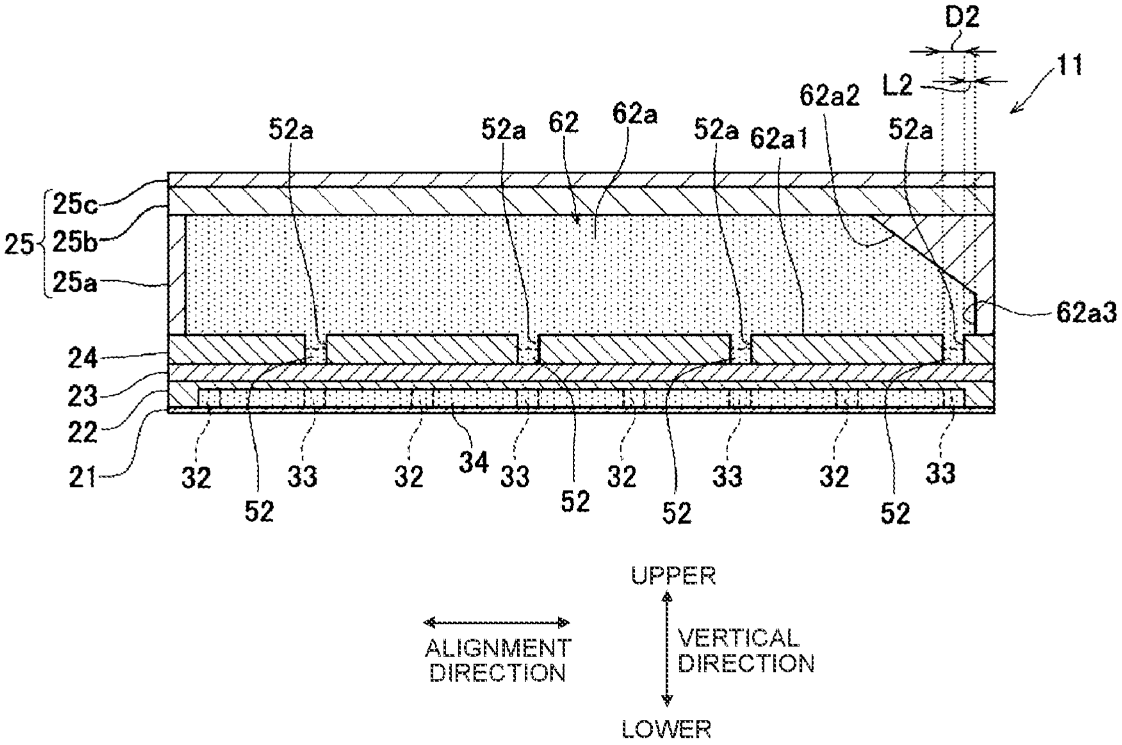
FIG. 12 is a cross-sectional view of the ink-jet head taken along a line XII-XII in FIGS. 3 to 7.

As depicted in FIG. 7, in the channel portion 62*a*, a length in the conveyance direction of its right end (the "end in the longitudinal direction of the second common channel" of the present disclosure) and the vicinity thereof is shorter toward the right side (toward a right end in FIG. 7). The bottom surface 62*a*1 of the channel portion 62*a* is horizontal over its entire area. Further, as depicted in FIG. 12, in a ceiling surface 62*a*2 of the channel portion 62*a*, its right end and the vicinity thereof are inclined to the sheet width direction so that they are positioned at the lower side of its left end and the vicinity thereof.

Of the four third return channels 52, the third return channel 52 positioned at the rightmost side ("one of the connection channels" "one of the third return channels" of the present disclosure") is connected to a right end of the bottom surface 62*a*1 of the channel portion 62*a*. More specifically, the connection opening 52*a* of the third return channel 52 is a circle having a diameter D2. A distance L2 between an end surface 62*a*3 at the right side of the channel portion 62*a* (the "end surface in the longitudinal direction of the second common channel" of the present disclosure) and the connection opening 52*a* of the third return channel 52 positioned at the rightmost side is shorter than the diameter D2 of the connection opening 52*a* (length in the sheet width direction). The distance L2 may be zero. That is, a right end of the end surface 62*a*3 and a right end of the connection opening 52*a* may have the same position in the sheet width direction. For example, the diameter D2 is approximately 100 to 500 μm, and the distance L2 is approximately 50 to 200 μm.

The channel portion 62*b* is connected to a left end of the channel portion 62*a*. The channel portion 62*b* extends in the alignment direction from the connection portion with the channel portion 62*a* to the center portion in the conveyance direction of the second common channel member 25. The channel portion 62*c* is connected to a front end of the channel portion 62*b*. The channel portion 62*c* extends rightward from the connection portion with the channel portion 62*b*. A right end of the channel portion 62*c* is formed having a discharge opening 62*e* that is opened in the upper surface of the second common channel member 25.

The discharge opening 62*e* is connected to the subtank 72 via the pump 71*b*. The pump 71*b* feeds ink from the discharge opening 62*e* toward the subtank 72.

Driving the pumps 71*a* and 71*b* causes ink in the subtank 72 to flow into the second supply channel 61 from the supply opening 61*e*. Part of ink in the second supply channel 61 flows into the third supply channels 51 from the communication openings 51*a*. A residual ink in the second supply channel 61 flows into the bypass channels 53 from the connection openings 53*a*1.

Ink in the third supply channels 51 flows into the supply communication channels 44, and then flows into the first supply channels 32 from the communication openings 32*a*. Part of the ink in the first supply channels 32 flows into the individual channels 40. Ink in the individual channels 40 flows into the first return channels 33 adjacent to the first supply channels 32 in the sheet width direction. A residual ink in the first supply channels 32 flows, via the bypass channels 34, into the first return channels 33 that are adjacent to the first supply channels 32 in the sheet width direction.

Ink in the first return channels 33 flows into the return communication channels 45 from the communication openings 33*a*, and then flows into the third return channels 52. Ink in the third return channels 52 flows from the communication openings 52*a* into the second return channel 62. Ink in the bypass channels 53 flows from the communication openings 53*b*1 into the second return channel 62. Ink in the second return channel 62 is discharged from the discharge opening 62*e* and returns to the subtank 72.

In the first embodiment, ink flows as described above by driving the pumps 71*a* and 71*b*, and thus ink circulates between the ink-jet head 11 and the subtank 72. Only one of the pumps 71*a* and 71*b* may be provided. Also in this case, ink can circulate between the ink-jet head 11 and the subtank 72 similarly to the above configuration by driving one of the pumps.

Effects of First Embodiment

In the first embodiment, air bubbles are likely to accumulate at an end of the second supply channel 61 at a side opposite to the supply opening 61*e* in the longitudinal direction (i.e., the left end of the channel portion 61*a*). Further, air bubbles are likely to accumulate at an end of the second return channel 62 at a side opposite to the discharge opening 62*e* in the longitudinal direction (i.e., the right end of the channel portion 62*a*).

In the first embodiment, the left end of the channel portion 61*a* is connected to one of the third supply channels 51. Thus, when ink flows from the second supply channel 61 to said one of the third supply channels 51, ink flows to the left end of the channel portion 61*a*. Such an ink flow reliably discharges air bubbles accumulated in the second supply channel 61.

In the first embodiment, the right end of the channel portion 62*a* is connected to one of the third return channels 52. Thus, when ink flows from one of the third return channels 52 to the second return channel 62, ink flows to the right end of the channel portion 62*a*. Such an ink flow reliably discharges air bubbles accumulated in the second return channel 62.

In the first embodiment, the distance L1 between the end surface 61*a*3 at the left side of the channel portion 61*a* and the connection opening 51*a* of the third supply channel 51 positioned at the leftmost side is shorter than the diameter D1 of the connection opening 51*a*. It is thus possible to reliably discharge air bubbles that are accumulated at the left end of the channel portion 61*a* and that has a diameter (length in the sheet width direction) larger than the diameter D1 of the connection opening 51*a*.

In the first embodiment, the distance L2 between the end surface 62*a*3 at the right side of the channel portion 62*a* and the connection opening 52*a* of the third return channel 52 positioned at the rightmost side is shorter than the diameter D2 of the connection opening 52*a*. It is thus possible to reliably discharge air bubbles that are accumulated at the right end of the channel portion 62*a* and that has a diameter (length in the sheet width direction) larger than the diameter D2 of the connection opening 52*a*.

Figure 13A:
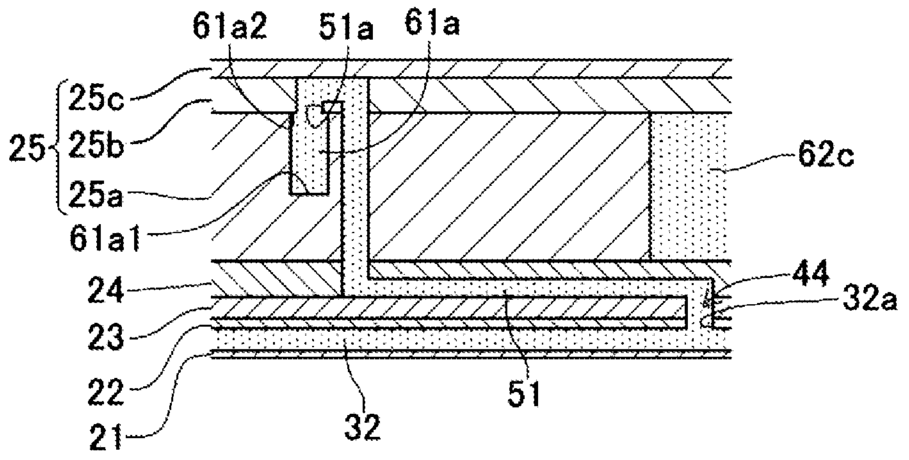
FIG. 13A is a cross-sectional view of the ink-jet head taken along a line XIIIA-XIIIA in FIGS. 3 to 7.

Air bubbles in the channel portion 61*a* float up. Thus, unlike the first embodiment, when the third supply channels 51 are connected to the bottom surface 61*a*1 of the channel portion 61*a*, air bubbles are not likely to flow from the channel portion 61*a* to the third supply channels 51. In the first embodiment, as depicted in FIG. 13A, the third supply channel 51 connected to the left end of the channel portion 61*a* is connected to the ceiling surface 61*a*2 of the left end of the channel portion 61*a*. Air bubbles accumulated at the left end of the channel portion 61*a* thus easily flow to the third supply channel 51.

Figure 13B:
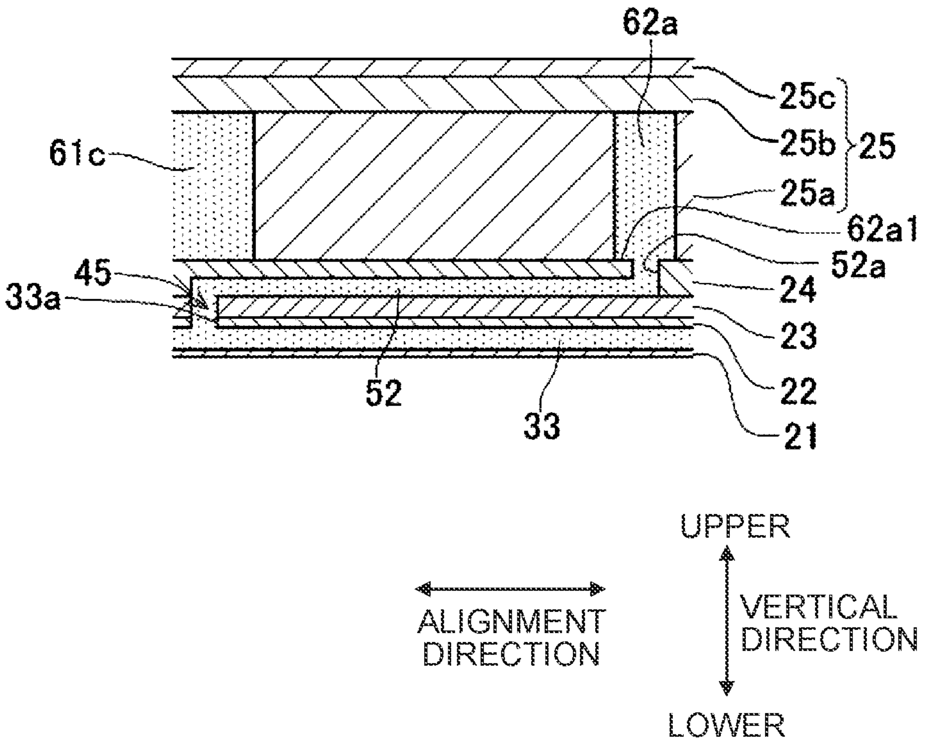
FIG. 13B is a cross-sectional view of the ink-jet head taken along a line XIIIB-XIIIB in FIGS. 3 to 7.

Air bubbles in the third return channels 52 tend to float up. In the first embodiment, as depicted in FIG. 13B, the third return channels 52 are connected to the bottom surface 62*a*1 of the channel portion 62*a*. Air bubbles in the third return channels 52 thus easily flow to the channel portion 62*a*.

Air bubbles in the channel portion 61*a* float up. In the bottom surface 61*a*1 of the channel portion 61*a* according to the first embodiment, its left end and the vicinity thereof are inclined to the sheet width direction (horizontal surface) so that they are positioned at the upper side of its right end and the vicinity thereof. Air bubbles accumulated at the left end of the channel portion 61*a* thus easily flow to the third supply channel 51.

In the left end and the vicinity thereof in the channel portion 61*a* according to the first embodiment, the length in the conveyance direction is shorter toward the left side. As described above, the left end and the vicinity thereof in the bottom surface 61*a*1 of the channel portion 61*a* are the inclined surface inclined to the sheet width direction. Thus, a cross-sectional area of a cross-section orthogonal to the longitudinal direction of the left end of the channel portion 61*a* is smaller than those of any other parts of the channel portion 61*a* except the left end. As a result, the flow velocity of ink at the left end of the channel portion 61*a* is fast, making it possible to reliably discharge air bubbles accumulated at the left end of the channel portion 61*a*.

In the right end and the vicinity thereof in the channel portion 62*a* according to the first embodiment, the length in the conveyance direction is shorter toward the right side. The right end and the vicinity thereof in the ceiling surface 62*a*2 of the channel portion 62*a* are inclined to the sheet width direction so that they are positioned at the lower side of its left end and the vicinity thereof. Thus, a cross-sectional area of a cross-section orthogonal to the longitudinal direction of the right end of the channel portion 62*a* is smaller than those of any other parts of the channel portion 62*a* except the right end. As a result, the flow velocity of ink at the right end of the channel portion 62*a* is fast, making it possible to reliably discharge air bubbles accumulated at the right end of the channel portion 62*a*.

Second Embodiment

Figure 14:
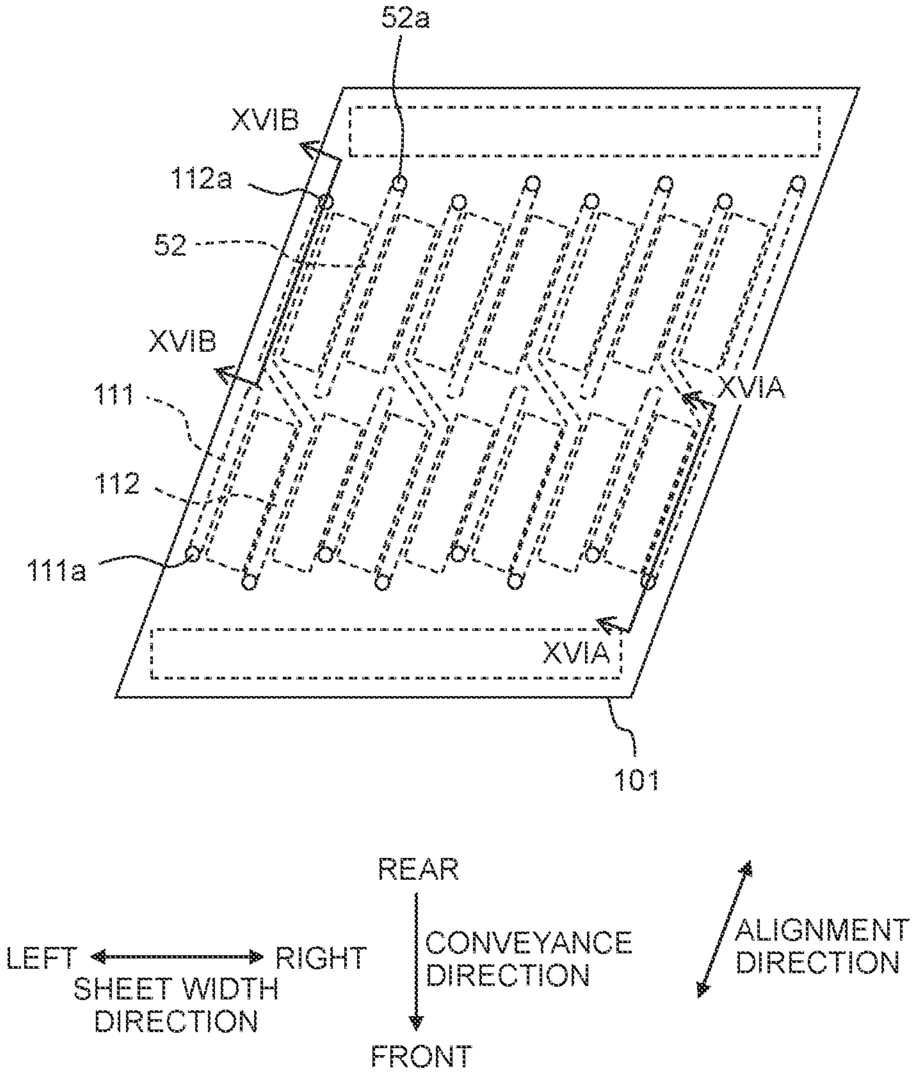
FIG. 14 is a plan view of a third common channel member of a second embodiment.
Figure 15:
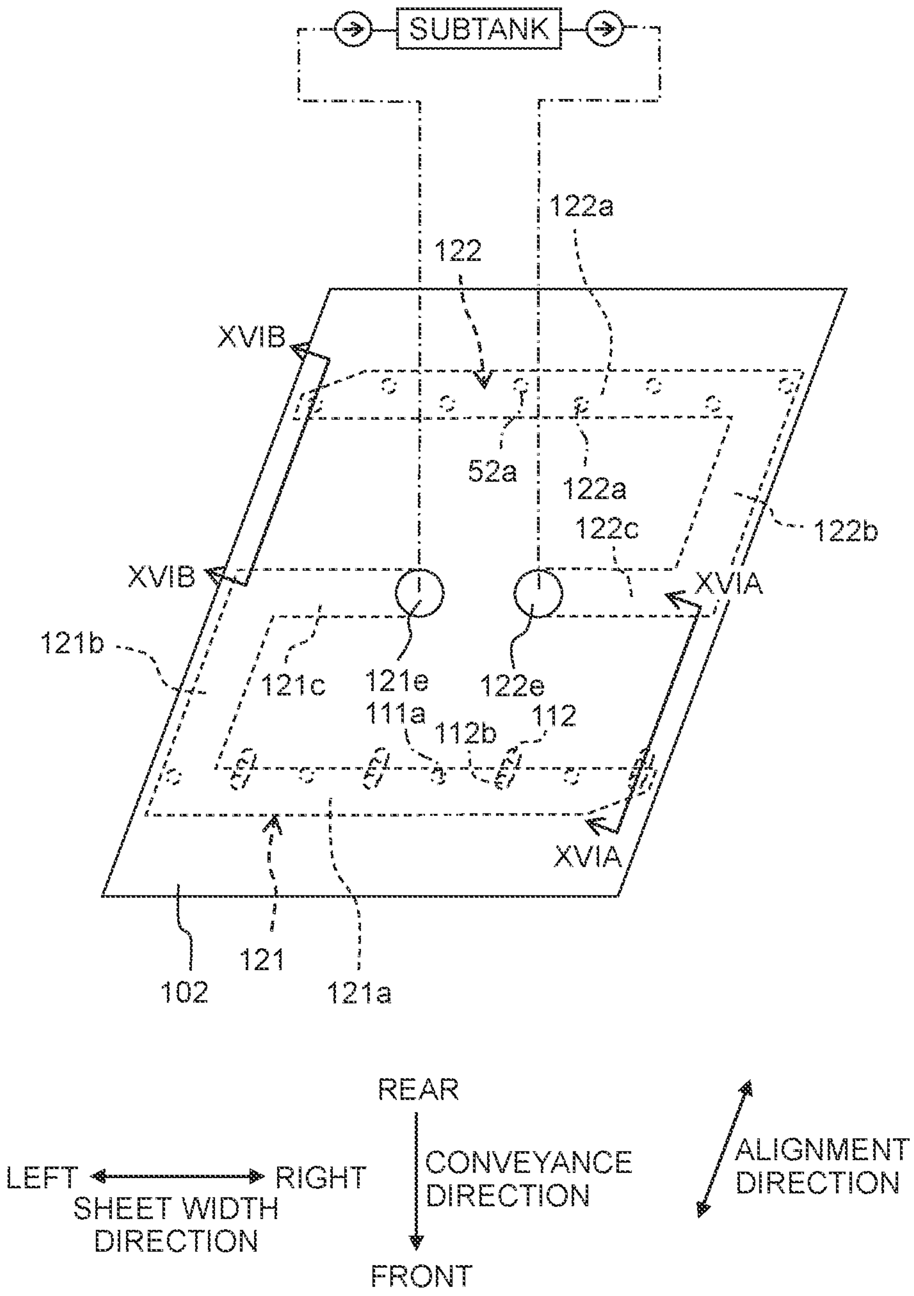
FIG. 15 is a plan view of a second common channel member of the second embodiment.
Figure 16A:
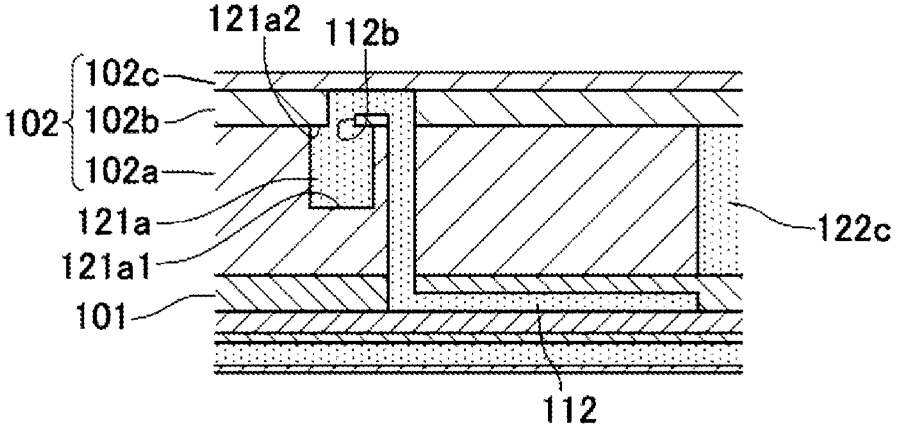
FIG. 16A is a cross-sectional view of an ink-jet head according to the second embodiment taken along a line XVIA-XVIA in FIGS. 14 and 15.

Subsequently, a second embodiment of the present disclosure is explained. In the second embodiment, as depicted in FIGS. 14 to 16, the whole of the third supply channels 111 is formed in a third common channel member 101, and the third supply channels 111 do not extend to a second common channel member 102. Each third supply channel 111 has a structure similar to the part of the third supply channel 51 that is formed in the third common channel member 24 according to the first embodiment. A front end of the third supply channel 111 is formed having a connection opening 111*a* that is opened in an upper surface of the third common channel member 101. The connection openings 111*a* are connected to a bottom surface 121*a*1 of a channel portion 121*a* of a second supply channel 121 formed in the second common channel member 102.

In the second embodiment, bypass channels 112 extend over the third common channel member 101 and the second common channel member 102. A part of each bypass channel 112 that is formed in the third common channel member 101 has a structure similar to the bypass channel 53 according to the first embodiment. In the second common channel member 102, each bypass channel 112 extends similarly to the part of the third supply channel 51 that is formed in the second common channel member 25 according to the first embodiment. The bypass channels 112 are connected to a ceiling surface 121*a*2 of the channel portion 121*a*.

Of the four bypass channels 112, the bypass channel 112 positioned at the rightmost side ("one of the connection channels" "one of the bypass channels" of the present disclosure) is connected to a right end of the ceiling surface 121*a*2 (the "end in the longitudinal direction of the second common channel" of the present disclosure).

Figure 16B:
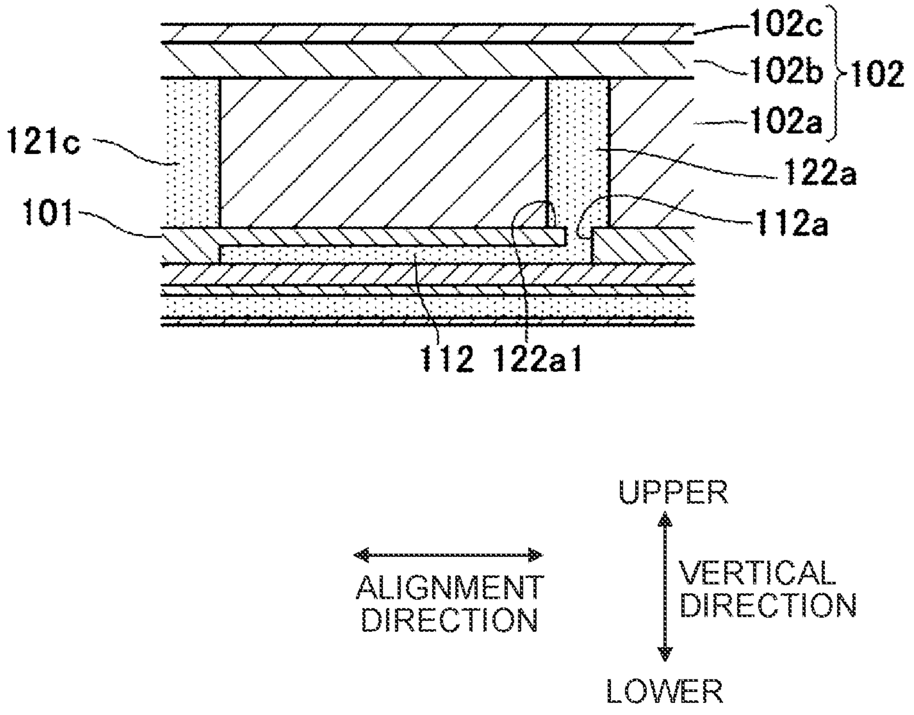
FIG. 16B is a cross-sectional view of the ink-jet head according to the second embodiment taken along a line XVIB-XVIB in FIGS. 14 and 15.

In the second embodiment, as depicted in FIGS. 15 and 16B, connection openings 112*a* provided at rear ends of the bypass channels 112 and the connection openings 52*a* of the third return channels 52 are connected to a bottom surface 122*a*1 of a channel portion 122*a* of the second return channel 122.

In the second supply channel 121 according to the second embodiment, as depicted in FIG. 15, a channel portion 121*b* is connected to a left end of the channel portion 121*a*, a channel portion 121*c* is connected to a rear end of the channel portion 121*b*, and a supply opening 121*e* is provided at a right end of the channel portion 121*c*. In the second return channel 122, a channel portion 122*b* is connected to a right end of the channel portion 122*a*, a channel portion 122*c* is connected to a rear end of the channel portion 122*b*, and a discharge opening 122*e* is provided at a left end of the channel portion 122*c*.

In the second embodiment, the second common channel member 102 is formed by stacking three plates 102*a* to 102*c*. Any other configurations than the above in the second embodiment are substantially similar to the first embodiment, and thus a detailed explanation therefor is omitted here.

Effects of Second Embodiment

In the second embodiment, air bubbles are likely to accumulate at an end of the second supply channel 121 at a side opposite to the supply opening 121*e* in the longitudinal direction (i.e., right end of the channel portion 121*a*).

Further, air bubbles are likely to accumulate at an end of the second return channel 122 at a side opposite to the discharge opening 122*e* in the longitudinal direction (i.e., left end of the channel portion 122*a*).

In the second embodiment, one of the bypass channels 112 is connected to the right end of the channel portion 121*a*. Thus, when ink flows from the second common channel 121 to said one of the bypass channels 112, ink flows to the right end of the channel portion 121*a*. Such an ink flow reliably discharges air bubbles accumulated at the right end of the channel portion 121*a*.

In the second embodiment, one of the bypass channels 112 is connected to the left end of the channel portion 122*a*. Thus, when ink flows from said one of the bypass channels 112 to the second return channel 122, ink flows to the left end of the channel portion 122*a*. Such an ink flow reliably discharges air bubbles accumulated at the left end of the channel portion 122*a*.

Air bubbles in the channel portion 121*a* float up. Thus, unlike the second embodiment, when the bypass channels 112 are connected to the bottom surface 121*a*1 of the channel portion 121*a*, air bubbles are not likely to flow from the channel portion 121*a* to the bypass channels 112. In the second embodiment, the bypass channel 112 connected to the right end of the channel portion 121*a* is connected to the ceiling surface 121*a*2 of the right end of the channel portion 121*a*. Air bubbles accumulated at the right end of the channel portion 121*a* thus easily flow to the bypass channel 112.

Air bubbles in the bypass channels 112 tend to float up. In the second embodiment, the bypass channels 112 are connected to the bottom surface 122*a*1 of the channel portion 122*a*. Air bubbles in the bypass channels 112 thus easily flow to the channel portion 122*a*.

MODIFIED EMBODIMENTS

The first and second embodiments of the present disclosure are explained above. The present disclosure, however, is not limited thereto. The present disclosure may be changed or modified without departing from the gist and the scope of the claims below.

In the first embodiment, in the bottom surface 61*a*1 of the channel portion 61*a* of the second supply channel 61, the left end and the vicinity thereof are inclined to the sheet width direction so that they are positioned at the upper side of the right end and the vicinity thereof. The present disclosure, however, is not limited to such an aspect.

First Modified Embodiment

Figure 17:
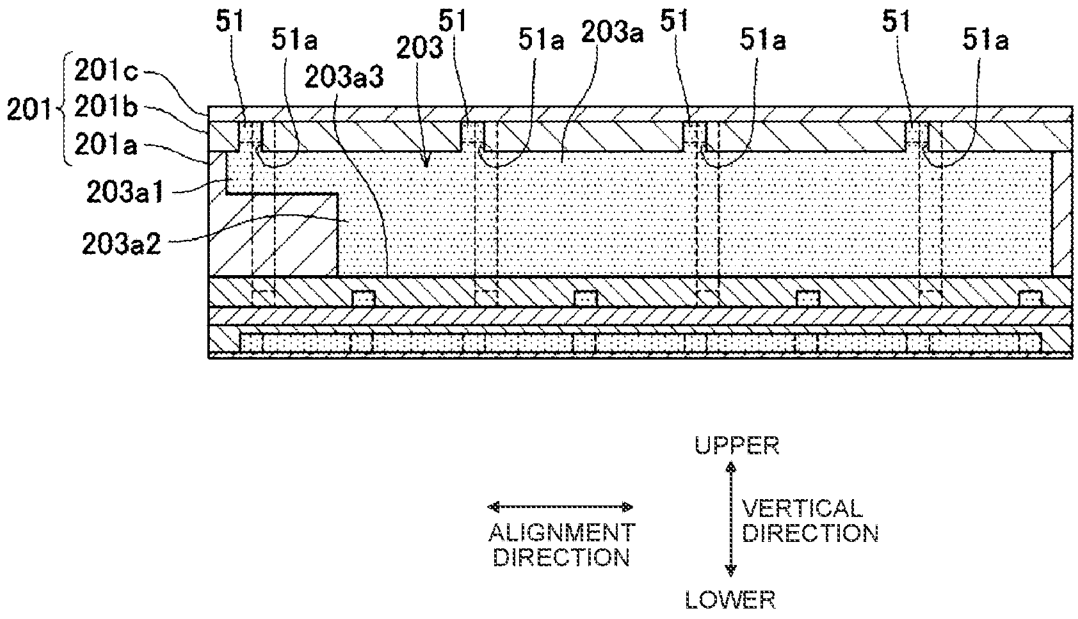
FIG. 17 corresponds to FIG. 11 and depicts a first modified embodiment.

In a first modified embodiment, as depicted in FIG. 17, in a second supply channel 203 formed in a second common channel member 201, an upper portion 203*a*1 of a channel portion 203*a* corresponding to the channel portion 61*a* according to the first embodiment extends to a position overlapping in the vertical direction with the third supply channel 51 positioned at the leftmost side, but a lower portion 203*a*2 does not extend to the position overlapping in the vertical direction with the third supply channel 51 positioned at the leftmost side. Thus, a left end of a bottom surface 203*a*3 of the channel portion 203*a* has a level difference or stepped portion where the left end of the bottom surface 203*a*3 is positioned at the upper side of any other parts of the bottom surface 203*a*3 except the left end. In the channel portion 203*a*, a height of a part of the upper portion 203*a*1 that extends leftward beyond the lower portion 203*a*2 is, for example, not more than half of a height of the channel portion 203*a*. In the first modified embodiment, the second common channel member 201 is formed by stacking three plates 201*a* to 201*c*.

Although air bubbles in the channel portion 203*a* float up, the bottom surface 203*a*3 of the channel portion 203*a* according to the first modified embodiment has the level difference where the left end of the bottom surface 203*a*3 is positioned at the upper side of any other parts of the bottom surface 203*a*3 except the left end. In this configuration, when ink flows from the left end of the channel portion 203*a* to the third supply channel 51, air bubbles accumulated at the left end of the channel portion 203*a* easily flows to the third supply channel 51. Further, the second supply channel can be formed in the second channel member more easily than a case, like the first embodiment, where the bottom surface is inclined to the sheet width direction, by providing such a level difference in the bottom surface 203*a*3 of the channel portion 203*a*.

In the bottom surfaces 61*a*1 and 203*a*3 of the channel portions 61*a* and 203*a*3 according to the first embodiment and the first modified embodiment, parts defining the left ends of the channel portions 61*a* and 203*a* are positioned at the upper side of any other parts of the bottom surfaces 61*a* and 203*a*3 except the left ends of the channel portions 61*a* and 203*a*. The present disclosure, however, is not limited to such an aspect. For example, the entire area of the bottom surface of the second supply channel may be horizontal.

In the second supply channels 61 and 121 according to the first embodiment and the second embodiment, the cross-sectional areas of the cross sections orthogonal to the longitudinal direction (sheet width direction) of the ends in the longitudinal direction (the left end of the channel portion 61*a*, the right end of the channel portion 121*a*) are smaller than those of any other parts of the second supply channels 61 and 121 except the ends in the longitudinal direction. In the second return channels 62 and 122, the cross-sectional areas of the cross sections orthogonal to the longitudinal direction (sheet width direction) of the ends in the longitudinal direction (the right end of the channel portion 62*a*, the left end of the channel portion 122*a*) are smaller than those of any other parts of the second return channels 62 and 122 except the ends in the longitudinal direction. The present disclosure, however, is not limited to such an aspect. In the channel portions 61*a*, 62*a*, 121*a*, and 122*a*, cross-sectional areas of cross sections orthogonal to the sheet width direction may be constant irrespective of the position in the sheet width direction.

Second Modified Embodiment

In the first embodiment, the third supply channels 51 are connected to the ceiling surface 61*a*2 of the channel portion 61*a* of the second supply channel 61. The present disclosure, however, is not limited to such an aspect.

Figure 18:
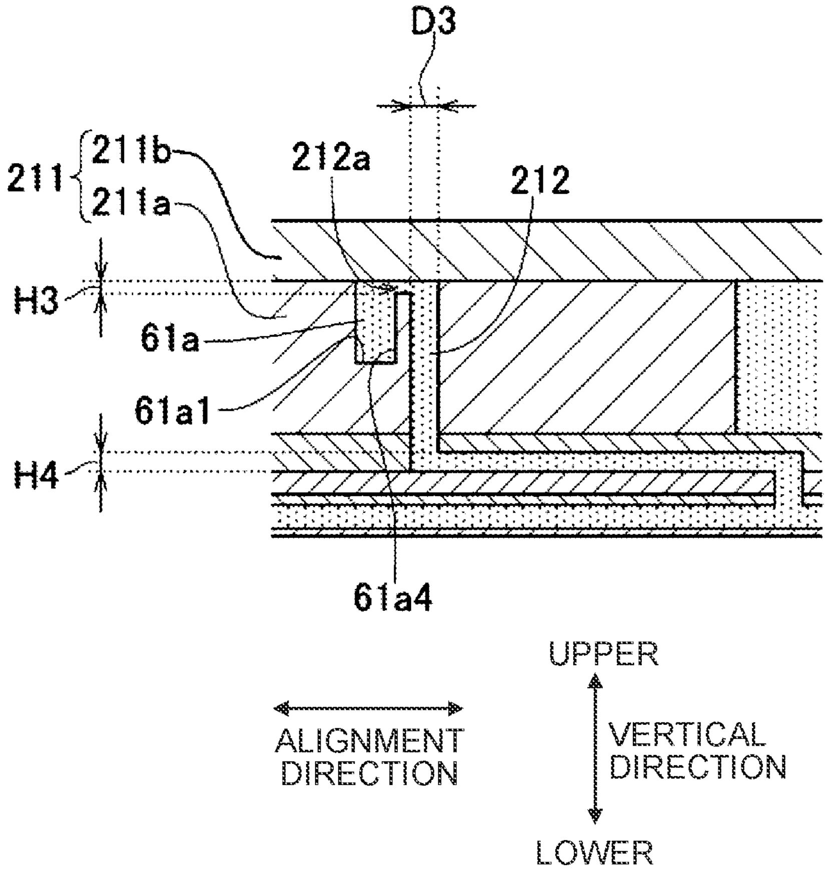
FIG. 18 corresponds to FIG. 13A and depicts a second modified embodiment.

In the second modified embodiment, as depicted in FIG. 18, an upper end of a part of a third supply channel 212 that extends in a second common channel member 211 in the vertical direction and the upper end of the channel portion 61*a* have substantially the same position in the vertical direction. The third supply channel 212 is connected to an upper end of a side wall surface 61*a*4 at the rear side of the channel portion 61*a*. In the second modified embodiment, the second common channel member 211 is formed by stacking two plates 211*a* and 211*b*. The third supply channel 212 may be connected to a lower portion of the side wall surface 61*a*4.

A height H3 of a connection opening 212*a* provided in the side wall surface 61*a*4 of the third supply channel 212 is smaller than a diameter D3 of the part of the third supply channel 212 that extends in the vertical direction and a height H4 of a part of the third supply channel 212 that extends in the alignment direction in the third supply channel member 24. For example, the height H3 is approximately 50 to 200 μm, and the diameter D3 and the height H4 are approximately twice the height H3. Thus, in the third supply channel 212, a cross-sectional area of a cross-section orthogonal to an ink flowing direction of the connection opening 212*a* is smaller than those of any other parts of the third supply channel 212 except the connection opening 212*a*. That is, a channel resistance of the connection opening 212*a* is larger than those of any other parts of the third supply channel 212 except the connection opening 212*a*.

Also in the second modified embodiment, air bubbles in the channel portion 61*a* float up. In the second modified embodiment, the third supply channel 212 connected to the left end of the channel portion 61*a* is connected to the side wall surface 61*a*4 of the left end of the channel portion 61*a*. Thus, air bubbles accumulated at the left end of the channel portion 61*a* easily flow to the third supply channel 212 compared to a case where the third supply channel connected to the left end of the channel portion 61*a* is connected to the bottom surface 61*a*1 of the channel portion 61*a*.

In the third supply channel 212 according to the second modified embodiment, the cross-sectional area of the cross-section orthogonal to the ink flowing direction of the connection opening 212*a* is smaller than those of any other parts of the third supply channel 212 except the connection opening 212*a*. That is, the channel resistance of the connection opening 212*a* is larger than those of any other parts of the third supply channel 212 except the connection opening 212*a*. Thus, when ink flows from the channel portion 61*a* to the third supply channel 212, the flow velocity of ink at the connection opening 212*a* is fast, making it possible to reliably discharge air bubbles accumulated at the left end of the channel portion 61*a*.

In the second modified embodiment, the third supply channel 212 is connected to the upper end of the side wall surface 61*a*4 at the rear side of the channel portion 61*a*. The present disclosure, however, is not limited to such an aspect. For example, in the second modified embodiment, the third supply channel 212 may be connected to a part of the side wall surface 61*a*4 at the lower side of the upper end.

Also in the second embodiment, similar to the second modified embodiment, the bypass channels 112 may be connected to a side wall surface in the conveyance direction of the channel portion 121*a* of the second supply channel 121.

In the third supply channels or the bypass channels according to any other examples than the second modified embodiment, the cross-sectional area of the cross-section orthogonal to the ink flowing direction of the connection portion with the second supply channel may be smaller than those of any other parts of third supply channel or the bypass channel except the connection portion. Or, in the third return channels or the bypass channels, the cross-sectional area of the cross-section orthogonal to the ink flowing direction of the connection portion with the second return channel may be smaller than those of any other parts of third return channel or the bypass channel except the connection portion.

In the third supply channels or the bypass channels, the cross-sectional area of the cross-section orthogonal to the ink flowing direction of the connection portion with the second supply channel may be larger than those of any other parts of the third supply channel or the bypass channel except the connection portion. In the third return channels or the bypass channels, the cross-sectional area of the cross-section orthogonal to the ink flowing direction of the connection portion with the second return channel may be larger than those of any other parts of the third return channel or the bypass channel except the connection portion. In the third supply channels, the third return channels, or the bypass channels, the cross-sectional area of the cross section orthogonal to the ink flowing direction may be substantially constant throughout the channel.

In the first embodiment, all the four third supply channels 51 connected to the channel portion 61*a* of the second supply channel 61 are connected to the ceiling surface 61*a*2 of the channel portion 61*a*. In the second embodiment, all the four bypass channels 112 connected to the channel portion 121*a* of the second supply channel 121 are connected to the ceiling surface 61*a*2 of the channel portion 121*a*. The aspects of the present disclosure, however, are not limited thereto.

For example, in the four third supply channels 51 according to the first embodiment, only some of the third supply channels 51 at least including the third supply channel 51 positioned at the leftmost side may be connected to the ceiling surface 61*a*2 of the channel portion 61*a*. Remaining third supply channel(s) 51 may be connected to the bottom surface 61*a*1 of the channel portion 61*a*. The same is applied to a case where the third supply channels are connected to the side wall surface 61*a*4 of the channel portion 61*a*, like the second modified embodiment.

Similarly, in the four bypass channels 112 according to the second embodiment, only some of the bypass channels 112 at least including the bypass channel 112 positioned at the rightmost side may be connected to the ceiling surface 121*a*2 of the channel portion 121*a*. Remaining bypass channel(s) 112 may be connected to the bottom surface 121*a*1 of the channel portion 121*a*. The same is applied to a case where the bypass channels are connected to the side wall surface of the channel portion 121*a*.

All the third supply channels and the bypass channels connected to the second supply channel may be connected to the bottom surface of the second supply channel.

In the above examples, all the third return channels and the bypass channels connected to the second return channel are connected to the bottom surface of the second return channel. The aspects of the present disclosure, however, are not limited thereto. For example, at least some of those channels may extend to the second common channel member and be connected to the ceiling surface or the side wall surface of the second return channel.

In the first and second embodiments, one of the third supply channels or one of the bypass channels is connected to the end in the longitudinal direction (the left end of the channel portion 61*a*, the right end of the channel portion 121*a*) of the second supply channel. One of the third return channels or one of the bypass channels is connected to the end in the longitudinal direction (the right end of the channel portion 62*a*, the left end of the channel portion 121*a*) of the second return channel. The aspects of the present disclosure, however, are not limited thereto.

For example, one of the third supply channels or one of the bypass channels may be connected to the end in the longitudinal direction of the second supply channel, and all the third return channels and the bypass channels may be connected to any other parts of the second return channel except the end in the longitudinal direction.

Or, all the third supply channels and the bypass channels may be connected to any other parts of the second supply channel except the end in the longitudinal direction, and one of the third return channels or one of the bypass channels may be connected to the end in the longitudinal direction of the second return channel.

Alternatively, the third common channel member may include, a connection channel connected to the second supply channel or the second return channel, in addition to the third supply channels, the third return channels, and the bypass channels. This connection channel may be connected to the end in the longitudinal direction of the second supply channel or the end in the longitudinal direction of the second return channel.

In the first embodiment, the distance L1 between the end surface 61*a*3 at the left side of the channel portion 61*a* and the connection opening 51*a* of the third supply channel 51 positioned at the leftmost side is shorter than the diameter D1 of the connection opening 51*a*. The distance L2 between the end surface 62*a*3 at the right side of the channel portion 62*a* and the connection opening 52*a* of the third return channel 52 positioned at the rightmost side is shorter than the diameter D2 of the connection opening 52*a*. In the second embodiment, a distance L3 between an end surface 121*a*3 at the right side of the channel portion 121*a* and a connection opening 112*b* of the bypass channel 112 positioned at the rightmost side is shorter than the diameter D3 of the connection opening 112*b*. A distance L4 between the end surface 62*a*3 at the left side of the channel portion 122*a* and the connection opening 112*a* of the bypass channel 112 positioned at the leftmost side is shorter than a diameter D4 of the connection opening 112*a*. The aspects of the present disclosure, however, are not limited thereto.

For example, each of the connection openings 51*a*, 52*a*, 112*b*, and 112*a* may have any other shape than the circle, and each of the distances L1 to L4 may be shorter than the length in the sheet width direction of each of the connection openings 51*a*, 52*a*, 112*b*, and 112*a*.

Alternatively, each of the distances L1 to L4 may be substantially the same as the length in the sheet width direction of each of the connection openings 51*a*, 52*a*, 112*b*, and 112*a* irrespective of the shape of each of the connection openings 51*a*. 52*a*, 112*b*, and 112*a*.

In the first embodiment, the first supply channels 32 and the first return channels 33 are formed in the first common channel member 22, the third supply channels 51 and the third return channels 52 are formed in the third common channel member 24, and the second supply channel 61 and the second return channel 62 are formed in the second common channel member 25. This allows ink to circulate between the ink-jet head 11 and the subtank 72. The aspects of the present disclosure, however, are not limited thereto.

For example, channels through which ink returns from the individual channels 40 to the subtank 72, like the first return channels 33 and the bypass channels 34 in the first common channel member 22, the third return channels 52 and the bypass channels 53 in the third common channel member 24, and the second return channel 62 in the second common channel member 25, may not be formed. In this configuration, similar to the first embodiment, the third supply channel 51 may be connected to the left end of the channel portion 61*a* of the second supply channel 61. In this case, for example, the nozzles 10 may be covered with a cap and a suction pump connected to the cap may be driven. This can discharge air bubbles by so-called suction purge in which ink in the ink-jet head 11 is discharged from the nozzles.

In this case, the channels through which ink is supplied from the subtank 72 to the individual channels 40, the channels being formed in the first common channel member 22, the third common channel member 24, and the second common channel member 25, correspond respectively to the "first common channels", the "connection channels", and the "second common channel" of the present disclosure. The same is applied to the second embodiment.

In the above examples, the supply opening is provided at an end at one side in the longitudinal direction of the second supply channel, and the third supply channel or the bypass channel is connected to an end at the other side in the longitudinal direction of the second supply channel. The discharge opening is provided at an end at one side in the longitudinal direction of the second return channel, and the third return channel or the bypass channel is connected to an end at the other side in the longitudinal direction of the second return channel. The aspects of the present disclosure, however, are not limited thereto.

For example, the supply opening may be provided at an intermediate portion in the longitudinal direction of the second supply channel, and the third supply channel or the bypass channel may be connected to at least one of ends in the longitudinal direction of the second supply channel. Similarly, the discharge opening may be provided at an intermediate portion in the longitudinal direction of the second return channel, and the third return channel or the bypass channel may be connected to at least one of ends in the longitudinal direction of the second return channel.

The above explanation is made about the examples in which the present disclosure is applied to the ink-jet head of the line type. The aspects of the present disclosure, however, are not limited thereto. For example, the present disclosure can be applied to a so-called serial head that is carried on a carriage and in which ink is discharged from nozzles during its movement together with the carriage.

The above explanation is made about the examples in which the present disclosure is applied to the ink-jet head in which ink is discharged from nozzles. The aspects of the present disclosure, however, are not limited thereto. The present disclosure can be applied to a liquid discharge head that discharges any other liquid than ink.

What is claimed is:

1. A liquid discharge head, comprising:

a first channel member including a plurality of individual channel rows and a plurality of first common channels that correspond to the respective individual channel rows, each of the individual channel rows including a plurality of individual channels that include a plurality of nozzles and that are aligned in a first direction, the individual channel rows being arranged in a second direction intersecting with the first direction, the first common channels extending in the first direction, the first common channels being arranged in the second direction, each of the first common channels communicating with the individual channels included in a corresponding one of the individual channel rows, a second channel member disposed at one side of the first channel member in a third direction orthogonal to the first direction and the second direction, and including a second common channel provided in common to the first common channels, and a third channel member disposed between the first channel member and the second channel member in the third direction, and including at least parts of a plurality of connection channels connected to the second common channel, the at least parts of the connection channels including a plurality of channels that correspond to the respective first common channels, each of the channels connecting a corresponding one of the first common channels and the second common channel, wherein one of the connection channels is connected to an end in a longitudinal direction of the second common channel, and wherein the liquid discharge head further comprises a communication opening disposed at a part of the second common channel except the end in the longitudinal direction of the second common channel, the second common channel communicating with the outside through the communication opening.

2. The liquid discharge head according to claim 1, wherein a distance between an end surface in the longitudinal direction of the second common channel and a connection opening through which one of the connection channels is connected to the second common channel is shorter than a length of the connection opening in the longitudinal direction of the second common channel.

3. The liquid discharge head according to claim 1, wherein the first channel member includes, as the first common channels, a plurality of first supply channels through which a liquid is supplied to the respective individual channels, wherein the second common channel of the second channel member is common to the first supply channels, wherein the third channel member includes, as the connection channels, a plurality of third supply channels connecting the respective first supply channels and the second common channel, and wherein one of the connection channels is connected to the end in the longitudinal direction of the second common channel.

4. The liquid discharge head according to claim 3, wherein one of the third supply channels is connected to the end in the longitudinal direction of the second common channel.

5. The liquid discharge head according to claim 4, wherein the third direction is a vertical direction of which upper side is the one side, wherein one of the third supply channels extends to the second channel member and is connected to a ceiling surface or a side wall surface of the end in the longitudinal direction of the second common channel.

6. The liquid discharge head according to claim 1, wherein the first channel member includes, as the first common channels, a plurality of first supply channels through which a liquid is supplied to the respective individual channels and a plurality of first return channels through which the liquid flows out of the respective individual channels, wherein the second common channel includes a plurality of second common channels, wherein the second channel member includes, as the second common channels, a second supply channel provided in common to the first supply channels and a second return channel provided in common to the first return channels, wherein the third channel member includes, as the connection channels, a plurality of third supply channels connecting the second supply channel and the respective first supply channels and a plurality of third return channels connecting the second return channel and the respective first return channels, wherein one of the connection channels is connected to an end in a longitudinal direction of the second return channel.

7. The liquid discharge head according to claim 6, wherein one of the third return channels is connected to the end in the longitudinal direction of the second return channel.

8. The liquid discharge head according to claim 7, wherein the third direction is a vertical direction of which upper side is the one side, and wherein one of the third return channels is connected to a bottom surface of the end in the longitudinal direction of the second return channel.

9. The liquid discharge head according to claim 6, wherein the third channel member further includes, as one of the connection channels, a bypass channel connecting the second supply channel and the second return channel, and wherein the bypass channel is connected to at least one of the end in the longitudinal direction of the second supply channel and the end in the longitudinal direction of the second return channel.

10. The liquid discharge head according to claim 9, wherein the third direction is a vertical direction of which upper side is the one side, and wherein the bypass channel extends to the second channel member and is connected to a ceiling surface or a side wall surface of the end in the longitudinal direction of the second supply channel.

11. The liquid discharge head according to claim 9, wherein the third direction is a vertical direction of which upper side is the one side, and wherein the bypass channel is connected to a bottom surface of the end in the longitudinal direction of the second return channel.

12. The liquid discharge head according to claim 1, wherein a cross-sectional area of a cross-section orthogonal to a liquid flowing direction of a connection opening through which one of the connection channels is connected to the second common channel, is smaller than a cross-sectional area of a cross-section orthogonal to the liquid flowing direction of any other part of said one of the connection channels except the connecting opening.

13. The liquid discharge head according to claim 1, wherein a cross-sectional area of a cross-section orthogonal to the longitudinal direction of the end in the longitudinal direction of the second common channel is smaller than a cross-sectional area of a cross-section orthogonal to the longitudinal direction of any other part of the second common channel except the end in the longitudinal direction.

14. The liquid discharge head according to claim 3, wherein the third direction is a vertical direction of which upper side is the one side, and wherein a bottom surface of the end in the longitudinal direction of the second supply channel is inclined to a horizontal surface so that a portion closer in the longitudinal direction of the second supply channel to the end in the longitudinal direction of the second supply channel is positioned at the upper side of a portion farther in the longitudinal direction of the second supply channel from the end in the longitudinal direction of the second supply channel.

15. The liquid discharge head according to claim 3, wherein the third direction is a vertical direction of which upper side is the one side, and wherein a bottom surface of the second supply channel has a level difference or stepped portion where the end in the longitudinal direction of the second supply channel is positioned at the upper side of any other part of the bottom surface of the second supply channel except the end in the longitudinal direction.

* * * * *